United States Patent
Sutton et al.

(10) Patent No.: US 6,539,354 B1
(45) Date of Patent: Mar. 25, 2003

(54) METHODS AND DEVICES FOR PRODUCING AND USING SYNTHETIC VISUAL SPEECH BASED ON NATURAL COARTICULATION

(75) Inventors: Stephen Sutton, Portland, OR (US); Pieter Vermeulen, Hillsboro, OR (US)

(73) Assignee: Fluent Speech Technologies, Inc., Beaverton, OR (US)

( * ) Notice: Subject to any disclaimer, the term of this patent is extended or adjusted under 35 U.S.C. 154(b) by 0 days.

(21) Appl. No.: 09/535,100

(22) Filed: Mar. 24, 2000

(51) Int. Cl.[7] .............................................. G10L 13/08
(52) U.S. Cl. ........................ 704/260; 704/235; 704/258; 345/423
(58) Field of Search .................................. 704/235, 258, 704/260, 270, 275, 276; 345/473, 676; 353/15, 16

(56) References Cited

U.S. PATENT DOCUMENTS

| | | |
|---|---|---|
| 3,463,885 A | 8/1969 | Upton |
| 3,585,303 A | 6/1971 | Chieffo |
| 4,104,625 A | 8/1978 | Bristow et al. |
| 4,260,229 A | 4/1981 | Bloomstein |
| 4,335,276 A | 6/1982 | Bull et al. |
| 4,835,556 A | 5/1989 | Spector |
| 4,884,972 A | 12/1989 | Gasper |
| 4,951,203 A * | 8/1990 | Halamka ............... 364/419 |
| 4,976,647 A | 12/1990 | Axtell |
| 5,191,449 A | 3/1993 | Newswanger |
| 5,313,522 A | 5/1994 | Slager |
| 5,347,306 A | 9/1994 | Nitta |
| 5,410,358 A | 4/1995 | Shackleton |
| 5,426,460 A | 6/1995 | Erving et al. |
| 5,498,189 A | 3/1996 | Townsend |
| 5,509,112 A | 4/1996 | Doi |
| 5,537,662 A | 7/1996 | Sato |
| 5,568,599 A | 10/1996 | Yoshino et al. |
| 5,588,096 A | 12/1996 | Sato |
| 5,596,362 A | 1/1997 | Zhou |

(List continued on next page.)

OTHER PUBLICATIONS

Luo "a novel approach for classifying speech into mouth shapes . . . " 1994 IEEE pp 465–468.*
Zhong "acoustic driven viseme identification for face animation" 1997 IEEE pp 7–12.*
Olives "towards a high quality finish talking head" IEEE 1999 pp 433–437.*
Goff "a text to audiovisual speech synhtesizer for french" IEEE pp 2163–2166.*
Kshirsagar "prinicipal components of expressive speech animation" 2001 IEEE pp 38–44.*
Chen "visual speech synthesis using quadtree splines" IEEE 2001 pp 153–156.*
Ezzat "mike talk" "a talking facial display based on morphing visemes" IEEE.*
Yang "automatic selection of visemes for image–based visual speech synthesis" 2000 IEEE pp 1081–1084.*

*Primary Examiner*—Marsha D. Banks-Harold
*Assistant Examiner*—Daniel Abebe
(74) *Attorney, Agent, or Firm*—Marger Johnson & McCollom P.C.

(57) ABSTRACT

A method of producing synthetic visual speech according to this invention includes receiving an input containing speech information. One or more visemes that correspond to the speech input are then identified. Next, the weights of those visemes are calculated using a coarticulation engine including viseme deformability information. Finally, a synthetic visual speech output is produced based on the visemes' weights over time (or tracks). The synthetic visual speech output is combined with a synchronized audio output corresponding to the input to produce a multimedia output containing a 3D lipsyncing animation.

54 Claims, 12 Drawing Sheets

U.S. PATENT DOCUMENTS

| | | | | |
|---|---|---|---|---|
| 5,608,839 A | | 3/1997 | Chen | |
| 5,613,056 A | | 3/1997 | Gaper et al. | |
| 5,630,017 A | | 5/1997 | Gasper et al. | |
| 5,638,502 A | | 6/1997 | Murata | |
| 5,644,690 A | | 7/1997 | Yoshino et al. | |
| 5,654,771 A | | 8/1997 | Tekalp | |
| 5,657,426 A | | 8/1997 | Waters | |
| 5,659,764 A | | 8/1997 | Sakiyama et al. | |
| 5,668,926 A | * | 9/1997 | Karali et al. | 704/232 |
| 5,689,618 A | * | 11/1997 | Gasper et al. | 704/271 |
| 5,736,982 A | | 4/1998 | Suzuki et al. | |
| 5,764,803 A | | 6/1998 | Jacquin et al. | |
| 5,793,372 A | | 8/1998 | Binns et al. | |
| 5,805,745 A | | 9/1998 | Graf | |
| 5,818,461 A | | 10/1998 | Rovet et al. | |
| 5,850,226 A | | 12/1998 | Nagasawa et al. | |
| 5,854,634 A | | 12/1998 | Kroiter | |
| 5,878,396 A | | 3/1999 | Henton | |
| 5,884,267 A | | 3/1999 | Goldenthal et al. | |
| 5,887,069 A | | 3/1999 | Sakou et al. | |
| 5,923,337 A | | 7/1999 | Yamamoto | |
| 5,941,570 A | | 8/1999 | Cole et al. | |
| 5,953,693 A | | 9/1999 | Sakiyama et al. | |
| 5,966,137 A | | 10/1999 | Murato | |
| 5,969,721 A | | 10/1999 | Chen et al. | |
| 5,970,459 A | | 10/1999 | Hahn et al. | |
| 5,978,507 A | | 11/1999 | Shakelton et al. | |
| 5,983,190 A | | 11/1999 | Trower, II et al. | |
| 5,990,878 A | | 11/1999 | Ikeda et al. | |
| 6,016,148 A | | 1/2000 | Kang et al. | |
| 6,020,892 A | | 2/2000 | Dillon | |
| 6,028,960 A | | 2/2000 | Graf et al. | |
| 6,031,539 A | | 2/2000 | Kang et al. | |
| 6,043,827 A | | 2/2000 | Graf et al. | |
| 6,037,949 A | | 3/2000 | DeRose et al. | |
| 6,112,177 A | * | 8/2000 | Cossato et al. | 704/260 |
| 6,208,356 B1 | * | 3/2001 | Breen | 345/473 |
| 6,208,963 B1 | * | 3/2001 | Martinez et al. | 704/232 |
| 6,250,928 B1 | * | 6/2001 | Poggio et al. | 434/185 |
| 6,439,723 B1 | * | 8/2002 | Tano | 353/15 |

\* cited by examiner

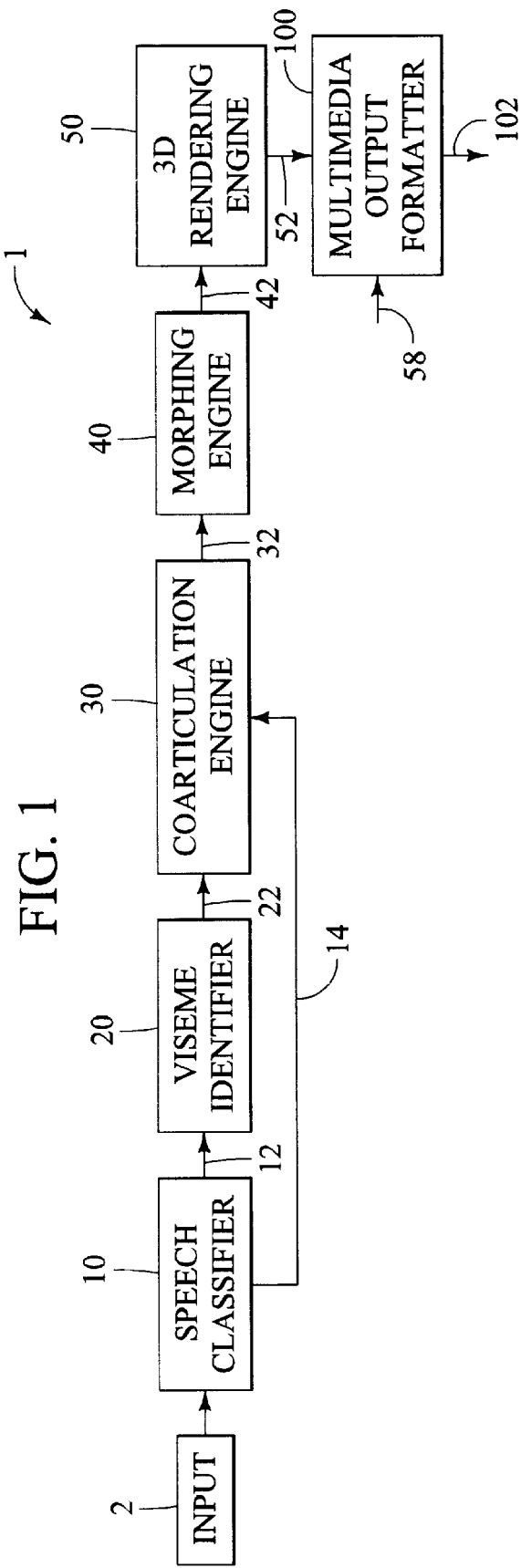
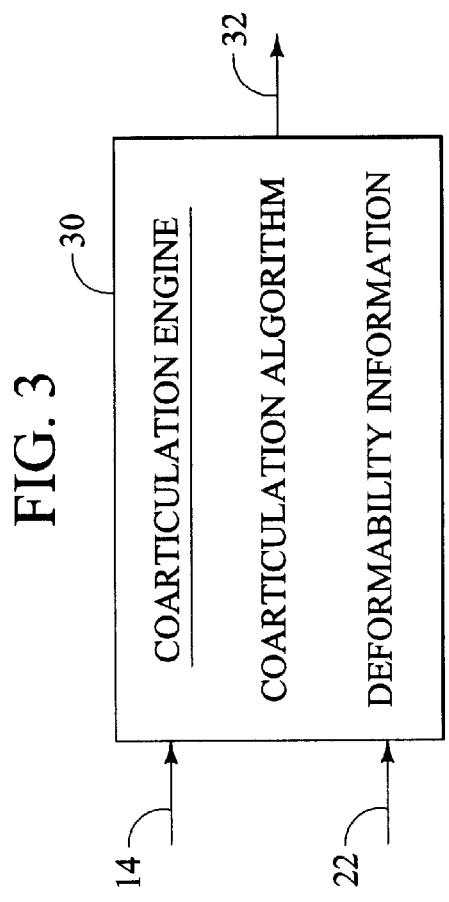

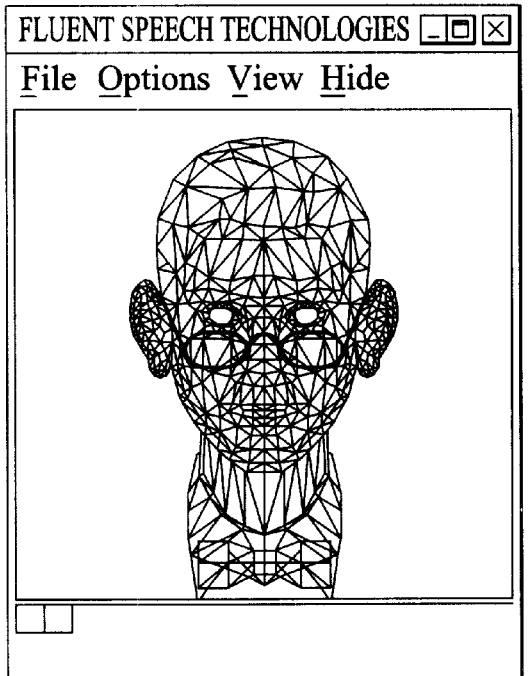
60A
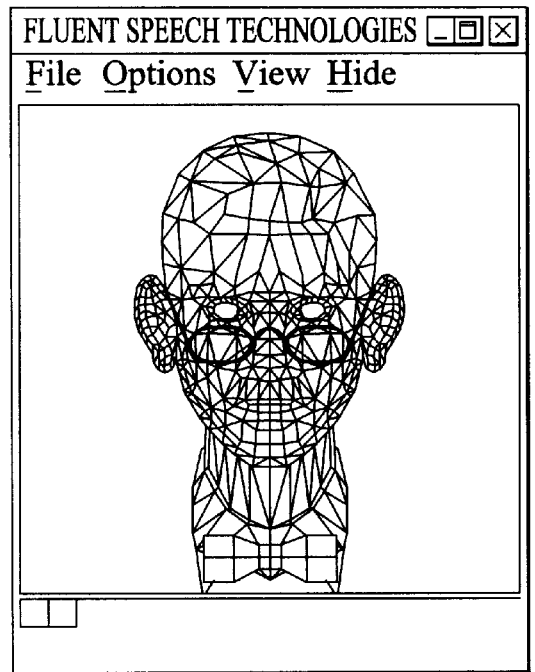
60B
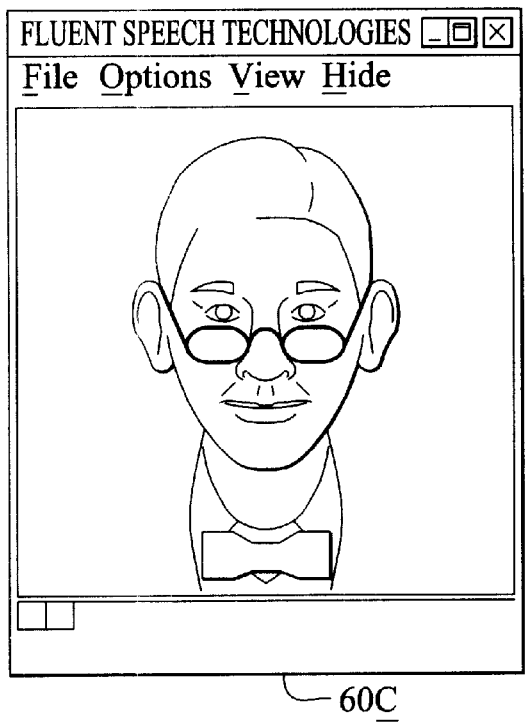
60C
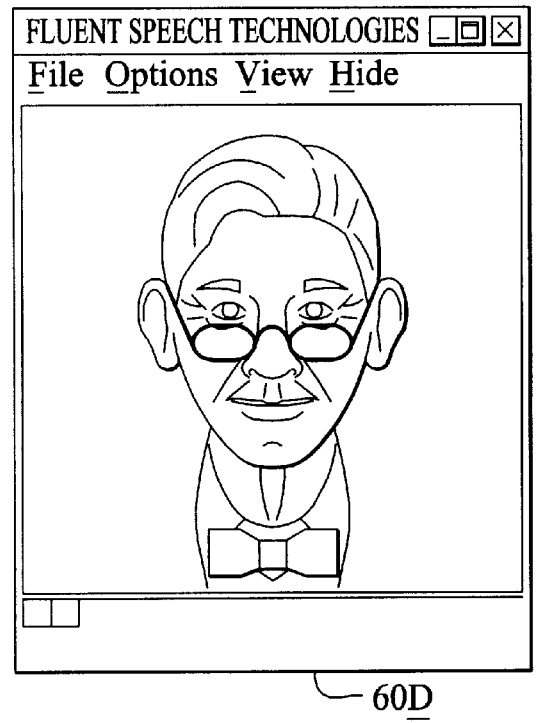
60D
FIG. 4

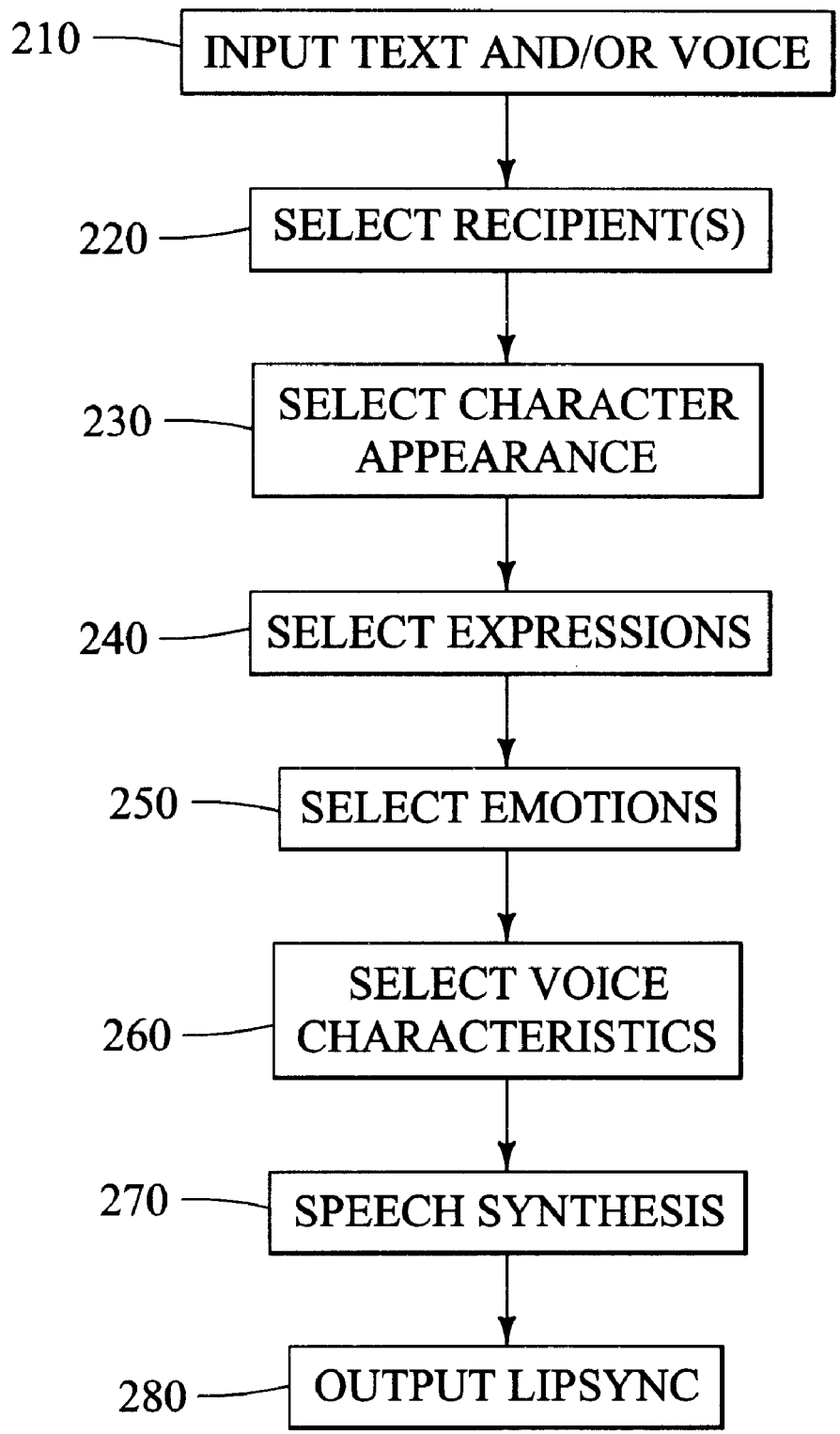

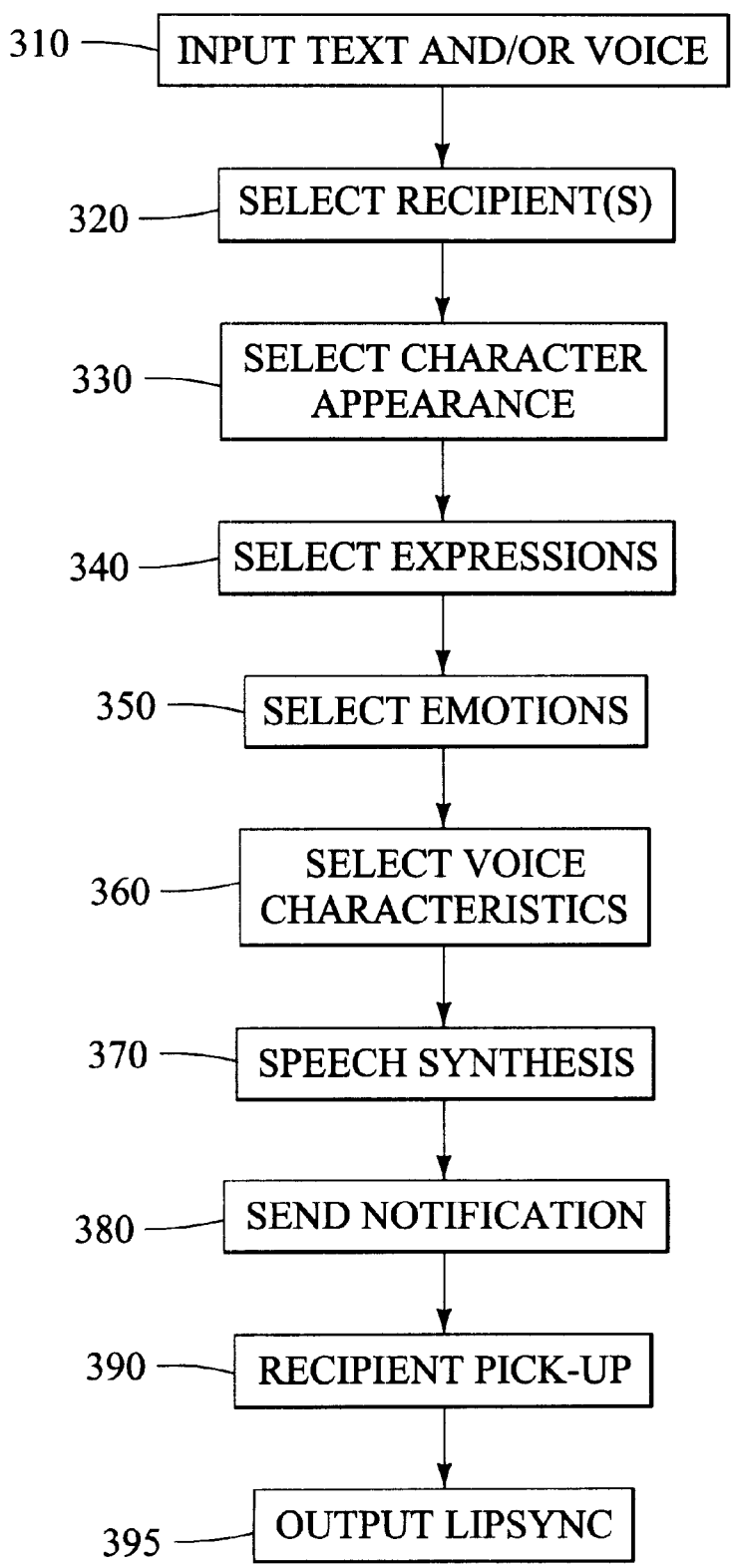

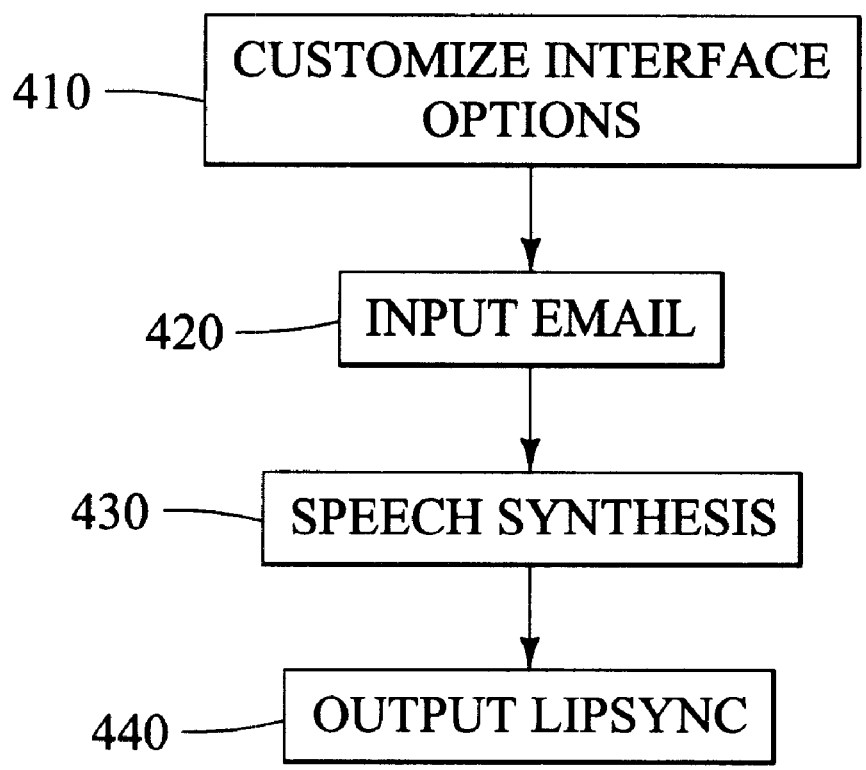

METHODS AND DEVICES FOR PRODUCING AND USING SYNTHETIC VISUAL SPEECH BASED ON NATURAL COARTICULATION

BACKGROUND OF THE INVENTION

This invention relates generally to computer generated synthetic visual speech, otherwise known as facial animation or lipsyncing. More specifically, this invention relates to methods and devices for generating synthetic visual speech based on coarticulation. This invention further relates to methods of using synthetic visual speech.

The natural production of human speech includes both auditory and visual components. The basic unit of sound for audible speech is the phoneme. Phonemes are the smallest unit of speech capable of independent auditory recognition. Similarly, visual speech is made up of visemes. Visemes are the visible corollary to phonemes. More specifically, a viseme is a visual speech representation defined by the external appearance of articulators (i.e., lips, tongue, teeth, etc.) during articulation of a corresponding phoneme. More than one phoneme may be associated with a single viseme, because many phonemes appear the same visually. Therefore, phonemes have a many to one relationship with visemes. Phonemes and visemes form the fundamental building blocks of visual speech synthesis.

Several conventional lipsyncing systems are available which produce synthetic visual speech in a variety of different ways. For example, some of these systems use a binary (on/off) method to move between visemes. In the binary method, the image of a first viseme appears until it is switched abruptly to the image of a second viseme. In the binary approach, therefore, there is no transitioning between visemes, a viseme is either completely visible or not at all visible at a given time. When visually depicting a sound moving from an /o/ to a /t/, as in the word "hot," for instance, the binary method displays the viseme corresponding to the /o/ until it abruptly changes to the viseme associated with the /t/. The result is very unrealistic, cartoon-like lipsyncing. An additional drawback of conventional binary systems is that they are generally limited to having only a few visemes to represent all of the possible sounds.

A better prior art approach to visual speech synthesis uses inbetweening (linear-type morphing) to transition between visemes. Morphing is a common technique for driving a 3D animation in which key frames are used to define particular configurations of a 3D model at given points in time. Morphing specifically refers to the process of interpolating between defined key frames over time to gradually transform one shape into another shape. Conventional lipsyncing systems sometimes use inbetweening (or linear interpolation based morphing) to approximate the contributions of multiple visemes to the overall appearance of the articulators at a given point in time during a viseme transition. These systems, therefore, more gradually transition between visemes by linearly combining the visemes together during the transition period. Despite the improvements that inbetweening offers over binary systems, it is still fairly unrealistic and does not accurately account for the mechanics of real speech.

A still more realistic prior art approach to the production of synthetic visual speech is parametric modeling. In parametric modeling, a specific, detailed, 3D model has parameters associated with each of the parts of the face—most importantly, the articulators. The whole model is defined in terms of multiple parameters, and the position of every point on the 3D model is defined by an extensive formula. Systems using parametric modeling (such as the Baldi system developed at the University of Southern California, Santa Cruz (UCSC)) have been better able to take into account contextual influences of natural visual speech production and are thereby able to produce more realistic-looking visual speech.

Unfortunately, however, parametric modeling requires the construction of a very complex graphical model. Consequently, a massive amount of work is required to create or modify these models. Also, because each of the parameters is defined in terms of a specific equation developed for that 3D model only, parametric modeling systems are 3D model dependent. These systems cannot be easily adapted for use with other 3D models. The difficulty of modifying the system to drive other 3D models makes parametric modeling rigid, complex, and expensive. Parametric modeling, therefore, does hot offer a general purpose solution to the problem of providing realistic facial animation.

U.S. Pat. No. 5,657,426 (the '426 patent) to Waters, et al, describes various methods of producing synchronized synthetic audio and visual speech which attempt to take into account factors influencing the natural production of human speech. The '426 patent attempts to account for these factors by interpolating between visemes using non-linear functions, such as cosine functions or equations based on Newtonian laws of motion.

Other relevant prior art publications include Massaro, D. W., Beskow, J., Cohen, M. M., Fry, C. L., Rodriguez, T., "Picture My Voice: Audio to Visual Speech Synthesis using Artificial Neural Networks," Proceedings of Auditory-Visual Speech Processing, Santa Cruz, Calif., August 1999; and Pelachaud, C., "Communication and Coarticulation in Facial Animation," Doctoral Dissertation, University of, Pennsylvania, 1991. An extensive collection of references to facial animation (lipsyncing) related articles, developments, and general information can be found at the University of California, Santa Cruz internet website: http://mambo.ucsc.edu/ps1/fan.html.

The "Picture My Voice" article by Massaro, D. W., et al describes a synthetic visual speech production process, that is worth mentioning briefly. Particularly, the article discloses use of a neural network to produce parameters to control a lipsyncing animation. This system has several drawbacks. Its primary drawback it that it relies on parametric modeling. Accordingly, it requires the use of a parameter estimator in which the single neural network converts the audio speech input features into control parameters for manipulating a specific parameterized 3D model. It is therefore model dependent. Furthermore, articulator position and movement in this systems is fine-tuned for a specific speaker and is therefore also speaker dependent.

The industry has struggled to produce a general purpose solution to the problem of providing realistic computer-generated lipsyncing. Parametric modeling systems are 3D model dependent. Simpler, more adaptable prior art systems, on the other hand, fail to accurately account for the real-life parameters influencing human speech. What is needed, therefore, is a method and apparatus for generating realistic synthetic visual speech that is speaker, vocabulary, and model independent, and that accurately accounts for factors of natural human speech production without undue processing requirements. The industry is also in need of applications that take advantage of general purpose synthetic visual speech generation.

SUMMARY OF THE INVENTION

This invention provides a significant improvement in the art by enabling a method and apparatus for producing synthetic visual speech. The method of producing synthetic visual speech according to this invention includes receiving an input containing speech information. One or more visemes that correspond to the speech input are then identified. Next, the weights of those visemes are calculated using a coarticulation routine. The coarticulation routine includes viseme deformability information and calculates viseme weights based on a variety of factors including phoneme duration, and speech context. A synthetic visual speech output is produced based on the visemes' weights over time (or viseme tracks). Producing the synthetic visual speech output can include retrieving a three-dimensional (3D) model (target model) for each of the visemes and morphing between selected target models based on their weights.

Several general processes are possible based on the synthetic visual speech production method of the present invention. One such process converts separate voice and text inputs containing coincidental speech information into synthetic visual speech. In that process, the text input is classified into its constituent phonemes and the corresponding visemes are identified. Calculating the visemes' weights is accomplished by forcing an alignment between the text input and the voice input to determine each viseme's duration and context. The viseme duration and context information is then input into a coarticulation routine that uses viseme deformability information in addition to the duration and context information to produce viseme tracks.

Another process proceeds by receiving a text-only input. The text-only input is converted into a synthesized audio and visual speech output by dividing the text input into its constituent phonemes and identifying the visemes that correspond to those phonemes. A coarticulation routine is used to calculate viseme weights for use in driving a morphing operation. The morphing operation produces blended models which are used to render the synthetic visual speech output. Because this process creates its own synthesized speech, the duration and context information it provides to the coarticulation routine is known without the need for a forced alignment process.

A still further process according to this invention proceeds by receiving a voice-only input. The visemes from the voice-only input are identified by running the voice input through a speech recognition routine. The speech recognition routine determines probable phonemes for the voice input. Visemes that correspond to the probable phonemes are then identified and their weights are calculated. A synthetic visual speech production process similar to those described above can then be conducted.

A system for producing synthetic visual speech includes a receiver to receive an input representing a speech segment. A neural network is used to divide the speech segment into its phonetic components. A coarticulation engine determines the viseme tracks for visemes corresponding to the phonetic components of the speech input using deformability information. A morphing engine morphs between successive visemes based on their tracks to enable a realistic synthetic visual speech output.

A coarticulation engine for calculating viseme tracks is configured to receive data inputs corresponding to a plurality of visemes. The data inputs represent a deformability, a context, and a duration of each of the visemes. The coarticulation engine is further configured to produce data outputs containing a weight for each of the visemes. According to one embodiment, the coarticulation engine can be a dedicated viseme estimator that takes a voice input directly and converts it into viseme tracks.

Several methods for using the synthetic speech production systems and processes of this invention are also contemplated. For instance, a method for generating a user-customizable 3D lipsyncing greeting card begins by receiving a user-defined input containing speech information. This input is converted into a customized electronic greeting card that includes a 3D visual speech animation synchronized with an audio speech output corresponding to the input. The 3D visual speech animation can be customized based on user-selected configurability options that can include selecting a character, texture mapping, supplying a background image, enabling auto-expressions, selecting emotions, selecting a singing voice, and selecting voice characteristics. Once created, the customized electronic greeting card is delivered to a recipient identified by the user.

In a method for producing a real-time computer animated lipsyncing, a voice input is supplied to a first neural network to produce a phoneme output. The phoneme output from the first neural network is provided to a second neural network to produce a viseme output. The viseme output is supplied to an animation generator to render an animated 3D lipsyncing image in real-time in substantial synchronism with an audio speech output. The lipsyncing can be produced "live" by reducing system buffers to that the output is delivered substantially simultaneously with the voice input. A viseme neural network can be used to reduce system buffers and minimize latency.

An apparatus for producing a real-time 3D lipsyncing animation includes a frame processor to identify frames of a voice input. A first neural network is configured to receive the frames of the voice input and to identify a probable phoneme corresponding to each of the frames. A second neural network is provided to receive the probable phonemes and identify viseme weights for one or more visemes active during each of the frames. A filter is configured to filter the viseme weights to produce a filtered and smoothed viseme track for each of the active visemes. A rendering engine is configured to render a 3D lipsyncing animation based on the viseme tracks in substantial synchronization with an audio output corresponding to the voice input. The lipsyncing animation of this embodiment can be rendered "live" —substantially simultaneous with the voice input.

A method for producing a synthesized visual communication over a network includes receiving an input containing speech information into a first networked device. The input is converted into phonetic speech components using a first neural network. The phonetic speech components are converted into weighted visual speech information (such as, but not limited to, viseme tracks) using a coarticulation routine. A 3D lipsyncing animation is then created based on the weighted visual speech information. The lipsyncing animation is displayed in substantial synchronism with an audibilization of a voice output through a second networked device. Any of the middle functions can be configured to take place on either the first or second networked devices, as desired.

A method for providing real-time synthetic communication includes providing an input containing speech information into a first one or more of a plurality of devices. The input is converted into viseme tracks using a coarticulation routine. A communication comprising an audio output and a synthesized visual speech animation is created based on the viseme tracks. The communication is output through a second one or more of the devices.

An email reader is also provided which includes a phoneme neural classifier for converting email text or email voice attachments into phonemes. An audio speech synthesizer is configured to synthesize an audio voice output based on the text input. The email reader further includes a coarticulation engine for determining weights of visemes associated with each of the phonemes and a morphing engine for morphing between target viseme models based on viseme weights. Finally, a rendering engine is provided for rendering an email lipsyncing animation based on data from the morphing engine. The email reader can also include user-customization options for allowing a user to select a lipsyncing character for the animation and a voice-type for the voice output. These customization options can be further configured to allow independent selection of the character and voice type for each of a plurality of email senders.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a block diagram outlining the basic components of a synthetic visual speech production system and process (lipsyncing system and process) according to this invention.

FIG. 3 is a block diagram showing the basic components of a coarticulation engine used in the synthetic visual speech production system of FIG. 1, according to one embodiment of this invention.

FIG. 4 contains images showing the construction of a 3D model as used in the visual speech production system of FIG. 1, including a 3D wireframe model, a filled and shaded wireframe model, and a final model.

FIG. 10 is a flow diagram illustrating the basic operation of a chat application that can proceed using the synthetic speech production process of FIG. 1, according to another embodiment of the present invention.

FIG. 11 is a flow diagram of a 3D greeting card application that can proceed using the lipsyncing process of FIG. 1, according to another embodiment of the invention.

FIG. 12 is a flow diagram of an email reader application that can proceed using the lipsyncing process of FIG. 1, according to a still further embodiment of the present invention.

DETAILED DESCRIPTION

Figure 2:
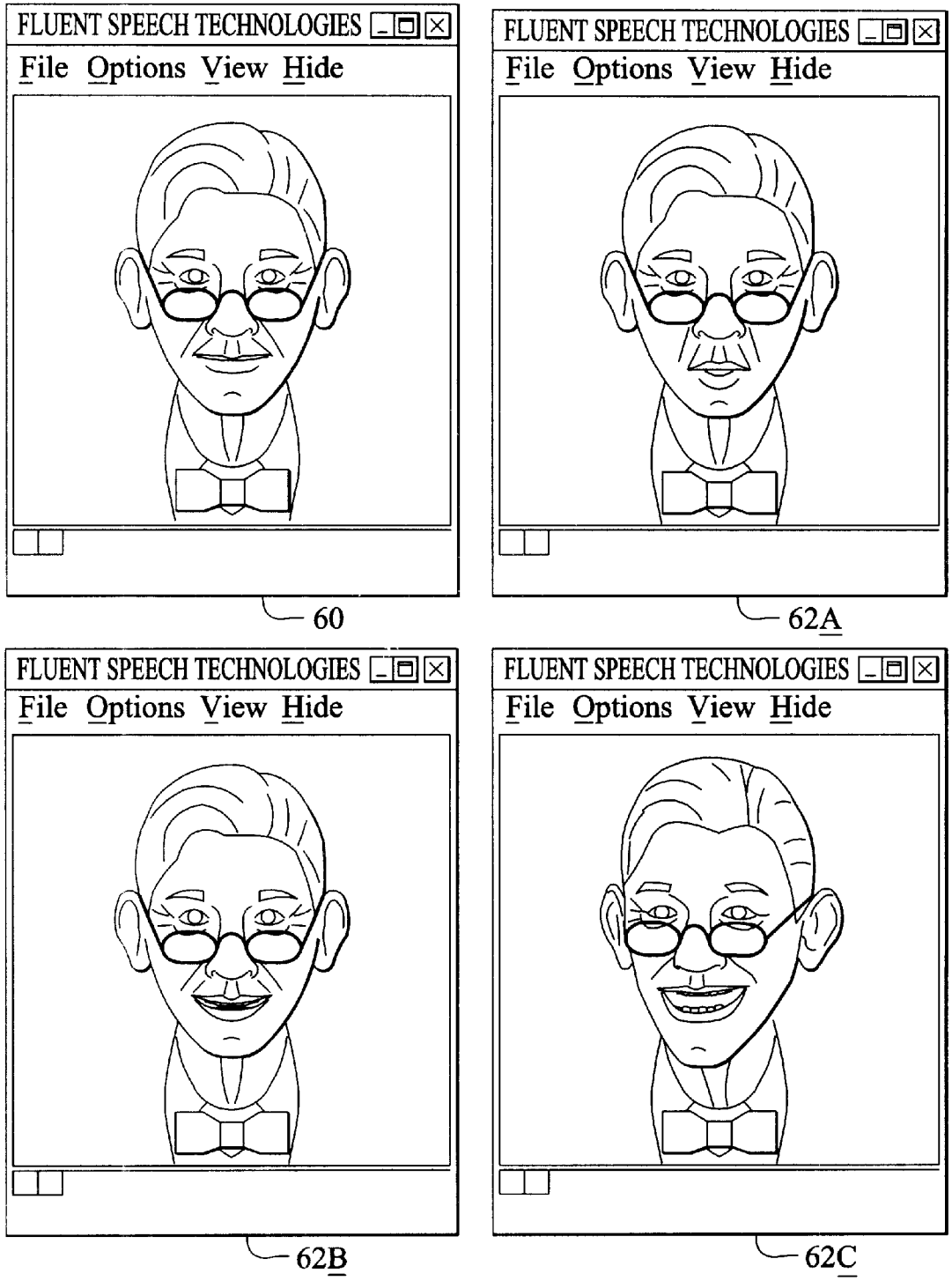
FIG. 2 contains images representing a neutral base model and target viseme models for producing synthetic visual speech according to the system and process of FIG. 1.

This invention provides an improvement in the art by more accurately accounting for the mechanics of natural speech in a general purpose synthetic visual speech production system and method. One of the primary considerations that should be taken into account when synthetically modeling natural speech is the effects of speech context on the articulation process. The notion that context influences visual speech production is known as coarticulation. Specifically, coarticulation is the process by which neighboring sounds influence the production of a current sound in human speech. Forward coarticulation refers to the influence of preceding sounds, while backward coarticulation refers to the influence of later occurring sounds. As mentioned earlier, phonemes and visemes are the fundamental building blocks of speech. In fluent speech, both phoneme and viseme production can be thought of as context-dependent.

According to this invention, the visual appearance of a phoneme (i.e., it's viseme) is determined at its salient point. The salient point does not occur at the same point in time during production of different phonemes. It is the point where people intuitively know what that sound would look like. The salient point typically corresponds to the point of articulation for the phoneme, or, in other words, the point in the audibilization of a phoneme at which the phoneme produces its maximum influence on the appearance of the articulators. It is at this point that the viseme target models are derived. Different phonemes have different salient points because they exert their maximum influence at different times (e.g., plosives achieve their maximum influence at time zero). This influence factor is related to the deformability criteria that will be discussed further below.

The mechanics of human speech can generally be defined with respect to positioning and movement of articulator parameters. Specifically, the production of any given sound involves the configuration of a combination of articulators including the tongue, teeth, jaw, lips, gums, throat, nose, and vocal chords. Only some of these articulators, however, are externally visually apparent and, therefore, important to visual speech applications. In terms of a 3D model for synthetic production of visual speech, only the jaw, teeth, lips, and tongue need to be modeled. Furthermore, the tongue will only be visible for certain sounds like /th/ and therefore has less precise modeling requirements.

During the production of real (natural) speech, there are certain fundamental mechanics that drive the timing and placement of the articulators. The distance between the positions of an articulator during an articulation of sequential sounds, as well as articulator momentum and weight, are factors in how long it will take to move an articulator between positions. These factors, in turn, strongly influence how far in advance a speaker needs to start planning to produce a particular sound.

There are also other influences on the dynamics of human speech. For instance; some individual sounds, like the fricative /sh/, require static articulator placement while others involve dynamic articulator movement, like a plosive /b/. Also, some sounds require more precise positioning than others. The sound /f/, for instance, requires a relatively precise static placement of articulators whereas the sound /a/ is reasonably forgiving. The notion of how forgiving the positioning of articulators is for any particular sound is referred to as deformability. The doctoral dissertation mentioned previously, by Pelachaud, entitled "Communication and Coarticulation in Facial Animation," discusses deformability considerations.

Deformability is an indicator of the flexibility of a particular viseme. When a viseme is very deformable, the articulators can be positioned in a number of different ways and still produce the desired sound fairly accurately. The more deformable a viseme is, the more forgiving it is in terms of articulator arrangement. Visemes that are more deformable demand less precise timing and positioning in preparation for their production than those which are less deformable. Most vowels (such as /o/, /a/, etc.), for instance, have highly deformable visemes.

Other visemes, however, are not very deformable. Visemes for fricatives (such as /sh/, /f/, etc.) and plosives (such as /b/, /p/, etc.), for example, are generally not very deformable. Less deformable visemes need to be planned for further ahead of time and require fairly precise articulator placement throughout their enunciation in order to be understood. Because of this, less deformable visemes have dominance over more deformable visemes. Deformability and dominance considerations give each viseme specific requirements in terms of articulator placement depending on the context (i.e., its neighboring visemes) in which the viseme occurs. This invention takes deformability considerations into account through the use of its unique coarticulation algorithm in order to produce a more realistic and adaptable output.

Some speech components are given special treatment in the synthetic visual speech production of this invention because of their mixed modeling requirements. Diphthongs, for example, are modeled as their constituent phonemes so that an automatic alignment process of the invention can determine the appropriate place to join the units of the diphthong.

FIG. 1 shows a block diagram of a lipsyncing method or apparatus 1 for producing synthetic visual speech according to the invention. As shown in FIG. 1, a lipsyncing system 1 according to this invention includes an input 2 which contains speech information. The speech input must be broken down into its phonetic components in order to be accurately modeled as visual speech. Accordingly, a speech classifier 10, preferably including a neural network, converts the speech input 2 into its constituent phonemes 12. A Viterbi search is generally part of the speech classifier 10 and is used to identify phonetic segmentation information 14, including duration information for each phoneme. A viseme identifier 20 identifies visemes 22 that correspond to the phonemes 12. Models associated with these visemes 22 become the target models for a subsequent morphing operation. The viseme identifier 20 can be part of either the speech classifier 10 or a coarticulation engine 30, or it can be its own separate system component.

The visemes 22 and segmentation information 14 are inputs to the coarticulation engine 30. The coarticulation engine 30 contains an algorithm (or a series of functions) that determines viseme overlap, addresses deformability issues, and smooths the viseme data to produce a set of viseme tracks (weight-time trajectories) 32. The viseme tracks 32 represent the influence of the visemes 22 on the articulator placement over time. In other words, the coarticulation engine uses viseme dominance and deformability information, along with the segmentation information 14 from the speech classifier 10, to produce coarticulation (or blending) data 32. The coarticulation data 32, or viseme tracks, are used in performing a morphing operation.

For a realistic synthetic visual speech result, the lipsyncing animation 52 must be accurately synchronized with the audio output 58. The key to accurate synchronization is knowing how much of each viseme 22 should be active at any given time. Because multiple visemes 22 can influence articulator position at any given time, multiple target models 62 (see FIG. 2) representing those visemes 22 must be expressed in the visual speech representation at a given time. To allow this, the coarticulation algorithm, within the coarticulation engine 30, generates activity ratios (also referred to as coarticulation data or viseme weights or tracks) 32 from the speech input 2. The viseme weights 32 are determined based on the coarticulation algorithm's knowledge of the dominance and deformability of the visemes, as well as on the duration and context information from the speech classifier 10. Morphing based on viseme weights 32 is used to obtain modeling data 42 that reflects the influence of each of the active visemes 22 and thereby transitions between visemes 22 in a realistic manner. This process of producing blended models (or modeling data) 42 based on viseme weight information 32 can be referred to as "automatic blending of multiple weighted targets."

During the morphing operation, a morphing engine 40 combines the viseme target models together over time based on the coarticulation data 32 to produce a series of blended models 42. Morphing using coarticulation data based on viseme deformability allows accurate synthetic modeling of realistic speech regardless of the speaker or the 3D model used.

The blended models 42 from the morphing engine 40 are sent to a rendering engine 50 that renders the blended models 42 sequentially in real-time to produce a synthetic visual speech output 52. The synthetic visual speech output 52 is also referred to as an animation or dynamic 3D model. According to this invention, the synthetic visual speech output 52 is synchronized with an audio speech output 58 and formatted by a multimedia output formatter 100 into a multimedia output 102. The multimedia output 102 can be in any one or more of a variety of formats. These formats can include, for instance, a movie format (i.e., AVI, Quicktime), a streaming media format (i.e., Realmedia, Advanced streaming format), or any other format capable of conveying multimedia content.

FIG. 2 contains a set of images graphically representing a neutral model 60 and target models 62 for a representative 3D character. Referring to FIG. 2, to create a visual speech animation, a neutral or base model 60, representing silence, plus a set of target models 62, representing visemes and other desired facial features, are created for a given 3D character. For increased speed during rendering, the target models 62 are represented as differences from the neutral model 60. It is generally relatively easy for a graphic artist to make minor adjustments to the neutral model 60 needed to obtain the target models 62. Each of the viseme target models 62 was configured based on experimentally-determined viseme appearances.

Referring now to FIGS. 1 and 2, morphing is used to transition between sequential visemes. Because sequential visemes will likely have overlapping influences, the morphing engine 40 combines (blends) the target models 62 for the visemes 22 together based on their percentage contributions (weights) to the overall image at a given point in time. The morphing engine 40, therefore, produces a blended model for a given point in time by blending the target models 62 of active visemes 22 together using the blending data 32 obtained from the coarticulation engine 30. Each blended model represents the influence of each of the visemes to the overall appearance of the image at that point in time. The timing at this stage of the system is determined based on an output frame rate of the system (typically 30–60 fps). The final output of the morphing engine 40 is a series of blended models 42 representing the viseme transitions of the speech input 2. This series of blended models 42 is sent to a 3D rendering engine 50 to render the models graphically.

FIG. 3 is a block diagram showing a few primary features of a coarticulation engine 30 according to one embodiment of the invention. Although the synthetic visual speech production system contains several important components, the coarticulation engine 30 is the key to accurate speech modeling because it accounts for the mechanics of real speech. Referring to FIG. 3, the coarticulation engine 30 of this invention receives phonetic segmentation information 14 (i.e., phoneme duration and context) and corresponding viseme data 22 from the speech classifier 10 and viseme identifier 20, respectively. The coarticulation engine 30 contains a coarticulation algorithm 34 that has been derived using the fine-tuned parameter manipulation formulas of the parametric modeling systems, the viseme deformability characteristics discussed in Pelachaud's article, and independent experimentation.

Generally, the coarticulation engine describes the way in which the visemes are combined to produce accurate synthetic visual speech. The coarticulation approach of this invention is unique and draws from a variety of sources. The goal of this approach is to deliver accurate articulation of speech (including accounting for coarticulation effects) in a manner that is independent of speaker, independent of speech (vocabulary), and independent of 3D model. The approach also capitalizes on speaker-independent speech recognition technology. The Background of the Invention introduces several works which have influenced the development of this system, including their advantages and drawbacks. This approach captures the advantages of much of the existing art, while overcoming its drawbacks.

Specifically, many of the methods and devices of this invention combine and extend two fundamental approaches to visual speech synthesis, namely, the parametric approach and the morphing approach. The coarticulation methodology, in particular, is partially derived from the parametric work by Cohen and Massaro (as described in Cohen, M. M. and Massaro, D. W. (1993): "Modeling coarticulation in synthetic visual speech", In N. M. Thalmann & D. Thalmann eds. Models and Techniques in Computer Animation. Tokyo: Springer-Verlag.). That work uses dominance functions to control parameter functions that describe the trajectories of each underlying parameter over time. In the coarticulation engine of this invention, however, instead of using dominance functions for each parameter that makes up the facial model, we adopt a unified approach whereby the functions are averaged across all parameters for a particular target viseme. In doing so, one aspect of this invention effectively eliminates the dependence of the 3D model on the coarticulation data while still benefiting from the very realitic, hand-crafted, control parameters that the parametric approach offers.

An additional extension of the above approach relates to the point of articulation. Instead of centering the viseme's maximum activation value at the center of the underlying phoneme, a part of this invention relies on the recognition that the point of articulation depends on the particular viseme. For instance, in order to make a plosive sounds (e.g., /b/, /p/) the lips must come together for the start of the phoneme, in contrast to most vowel which tends towards the middle. As such, another aspect of this invention is to explicitly model the point of maximum articulation for each viseme, which in turn affects the onset and offset point of viseme activation.

Yet another aspect of this invention is to further extend the approach described above by taking into account deformability criteria, as introduced by C. Pelachaud, 1991. As noted previously, deformability refers to the relative flexibility of a target viseme and is used to determine how much it can be influenced by other overlapping visemes. Those visemes that are highly deformable are suppressed while those that are relatively undeformable are emphasized, when their visemes coincide. These deformability criteria have the effect of emphasizing certain important, influential visemes. It is the often the case, in the embodiments of this invention, that visemes are suppressed and are therefore unable to reach their maximum value because of the effects of neighboring visemes. In terms of the mechanical dynamics of real speech, this essentially models the effect where the articulators are not able to reach the target position they are moving towards because they must prepare for some future (or past) sound which may be more dominant.

The output of the coarticulation model is a series of time-percentage values (tracks) for each viseme. The time-percentage values specify that.a particular viseme is active at a particular time, with a certain percentage. The percentages can be allowed to exceed 100% or limited (cut-off) as desired.

The data rate of the coarticulation model can also be specified. This is an implementation efficiency that allows the viseme tracks to be (optionally) synchronized to the target frame rate that the model will be rendered at. The viseme tracks can be further pruned by discarding static data points. For instance, if the active percentage remains at zero or is limited to 100% for an extended period, all in-between data points can be discarded. This reduces the amount of data generated and also the amount of work the morphing engine and rendering engine has to do.

The coarticulation data is designed to drive a morphing-based rendering engine, based on the automatic blending of multiple weighted targets (visemes). The decoupling of model from the coarticulation component results in a general purpose approach that can be used to drive any arbitrary 3D model (with appropriate visemes defined). Furthermore, input to the coarticulation model includes phonetic information from the speaker-independent and vocabulary-independent speech recognizer system. The combined end result is a very general, flexible, high-quality solution that can accept input from any speaker, using any words and which generates data that can drive any arbitrary 3D model. The system can easily be extended to languages other than English due to it's phonetic-based foundation and the use of the Worldbet phonetic symbol set which is specifically designed to cover all the world's languages in a systematic fashion.

Phoneme-to-viseme mappings is another important consideration in this invention. Viseme labels are arbitrary names. Phoneme symbols are defined in terms of the Worlbet phonetic symbol set, as described in: James L. Hieronymus, *ASCII Phonetic Symbols for the World's Languages: Worldbet*; Technical report, AT&T Bell Laboratories, Murray Hill, N.J. 07974 USA, 1994. It can currently be obtained from the internet at the following ftp site: ftp://speech.cse.ogi.edu/pub/docs/worldbet.ps. A brief table illustrating the Worldbet is provided below.

| Viseme | Phoneme |
|---|---|
| vis_m | "m" |
| vis_p | "ph b" |
| vis_f | "fv" |
| vis_T | "TD" |
| vis_d | "th d n N kh g h j" |
| vis_s | "s z Z" |
| vis_l | "l" |
| vis_r | "9r 3r" |
| vis_S | "S tS dZ" |
| vis_w | "w" |
| vis_i | "i: I" |
| vis_E | "E @" |
| vis_ao | ">" |
| vis_a | "A ^" |
| vis_U | "U" |
| vis_u | "u &r &" |
| vis_neutral | ".pau.garbage" /* used for rejection modeling */ |

Following are the deformability clusters according to a presently preferred embodiment of this invention. The specific deformability parameters for each phoneme are listed later.

upperteeth "f v ph"
relaxpucker "aU"
puckernarrow "w 9r u U oU 3r"
liptogether "p b m"
tongue "T D"
forward "S Z tS dZ"
back "i: I I_x ei ^"
rounded">"
teethtogether "s z"
roundback ">i"
tongueupdown "d t th n=n l=l"
relaxmoderate "E @ A &r"
relaxback "aI"
tonguebackup "k kh g N"
jj "j"
hh "h"
schwa "&"
neutral "pau .pau.garbage"

The parameters used in the coarticulation calculations of the preferred embodiment, along with a brief explanation are listed below.

Key
Strength—determines height of dominance function
Offset—position of target max, expressed as percentage of phoneme duration
Attack—determines onset angle of dominance function
Decay—determines offset angle of dominance function
Deform—deformability percentage
Viseme—name
Phoneme—name The specific parameters used in the coarticulation routine for the various visemes according to the preferred embodiment are as follows.

strength, offset, attack, decay, deform, viseme, phoneme
0.96, 0.5, 0.013, 0.013, 60, VIS_ao, >
0.92, 0.0, 0.021, 0.021, 95, VIS_p, ph
0.90, 0.0, 0.021, 0.022, 95, VIS_p, b
0.95, 0.5, 0.013, 0.013, 35, VIS_a, A
0.94, 0.5, 0.013, 0.013, 80, VIS_a, ^
0.94, 0.2, 0.015, 0.015, 85, VIS_r, 9r
0.93, 0.2, 0.013, 0.013, 85, VIS_r, 3r
0.88, 0.1, 0.014, 0.013, 50, VIS_s, s
0.88, 0.1, 0.014, 0.013, 50, VIS_s, z
0.93, 0.1, 0.013, 0.013, 80, VIS_s, Z
0.95, 0.1, 0.014, 0.013, 80, VIS_S, S
0.92, 0.0, 0.013, 0.013, 80, VIS_S, tS
0.94, 0.0, 0.013, 0.013, 80, VIS_S, dZ
0.95, 0.0, 0.013, 0.014, 80, VIS_T, T
0.93, 0.0, 0.013, 0.013, 80, VIS_T, D
0.86, 0.2, 0.021, 0.021, 40, VIS_d, th
0.83, 0.0, 0.021, 0.023, 40, VIS_d, d
0.86, 0.1, 0.015, 0.015, 40, VIS_d, n
0.91, 0.1, 0.013, 0.013, 10, VIS_d, N
0.89, 0.0, 0.021, 0.021, 10, VIS_d, kh
0.90, 0.0, 0.021, 0.022, 10, VIS_d, g
0.91, 0.3, 0.013, 0.013, 10, VIS_d, h
0.92, 0.0, 0.013, 0.013, 10, VIS_d, j
0.93, 0.5, 0.014, 0.013, 85, VIS_u, u
0.95, 0.4, 0.013, 0.013, 35, VIS_u, &r
0.93, 0.5, 0.013, 0.013, 10, VIS_u, &
0.96, 0.5, 0.013, 0.013, 85, VIS_U, U
0.93, 0.5, 0.013, 0.013, 35, VIS_E, E
0.95, 0.5, 0.013, 0.013, 35, VIS_E, @
0.93, 0.0, 0.013, 0.013, 95, VIS_f, f
0.93, 0.0, 0.013, 0.013, 95, VIS_f, v
0.95, 0.0, 0.013, 0.013, 85, VIS_w, w
0.91, 0.5, 0.013, 0.013, 80, VIS_i, i:
0.93, 0.5, 0.013, 0.013, 80, VIS_i, I
0.89, 0.5, 0.013, 0.013, 25, VIS_neutral, .pau
0.89, 0.5, 0.013, 0.013, 25, VIS_neutral, .garbage
0.89, 0.5, 0.013, 0.013, 100, VIS_neutral, bc
0.89, 0.5, 0.013, 0.013, 100, VIS_neutral, dc
0.89, 0.5, 0.013, 0.013, 100, VIS_neutral, gc
0.89, 0.5, 0.013, 0.013, 100, VIS_neutral, dZc
0.89, 0.5, 0.013, 0.013, 100, VIS_neutral, pc
0.89, 0.5, 0.013, 0.013, 100, VIS_neutral, tc
0.89, 0.5, 0.013, 0.013, 100, VIS_neutral, kc
0.89, 0.5, 0.013, 0.013, 100, VIS_neutral, tSc
0.89, 0.5, 0.013, 0.013, 100, VIS_neutral, vc
0.89, 0.5, 0.013, 0.013, 100, VIS_neutral, uc
0.82, 0.5, 0.013, 0.013, 40, VIS_l, l
0.94, 0.5, 0.013, 0.013, 95, VIS_m, m In operation, the coarticulation algorithm 34 in the coarticulation engine 30 uses the deformability data provided above to determine the amount of contribution from each active viseme 22 to articulator placement over time. The coarticulation engine 30 also uses the phonetic segmentation information 14 and viseme data 22 in making these calculations. The coarticulation algorithm therefore takes the influence of neighboring visemes 22 into account in determining the shape of the viseme tracks 32. Deformability information, namely, information regarding which visemes 22 are more or less flexible, guides the coarticulation routine when resolving the effects of neighboring sounds.

Dominant, less deformable sounds have more influence than deformable ones on neighboring sounds. More specifically, because the algorithm 34 of the coarticulation engine 30 is uses the deformability information provided above, it is able to accurately resolve influences between active visemes 22.

Because of its unique configuration, the coarticulation engine 30 of this invention can process speech from any speaker and does not need speaker-specific training or otherwise need to learn speaker-specific characteristics. Also, because it is phoneme-based rather than word-based, the coarticulation engine 30 can process any words or phrases as input and is not limited to a fixed vocabulary. It is also not limited to any given language.

As noted previously, each viseme's contribution (or weight) over time is represented by an activity pattern referred to as a viseme track 32. Tracks 32 are generated and output by the coarticulation engine 30 for each of the visemes 22 that contribute to the placement of the articulators during the speech segment 2. Each viseme track 32 specifically contains timestamp and percentage weight information representing that viseme's influence on articulator placement over time. These viseme > tracks 32 are output from the coarticulation engine 30 and form the blending data 32 for driving the morphing operation.

Figure 5A:
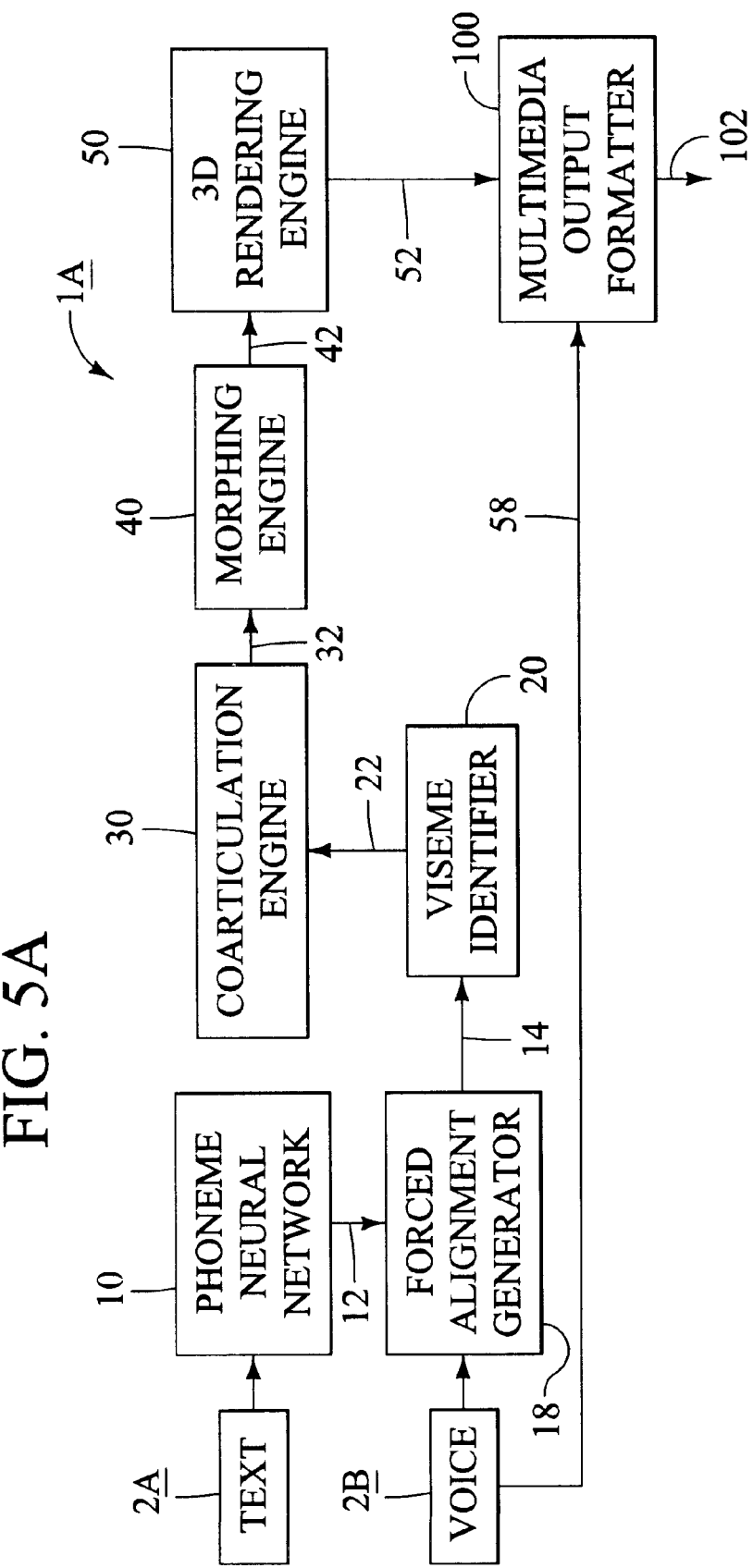
FIG. 5A is a block diagram illustrating the synthetic visual speech production process of FIG. 1 based on a text input and a corresponding voice input according to another embodiment of the present invention.
Figure 5B:
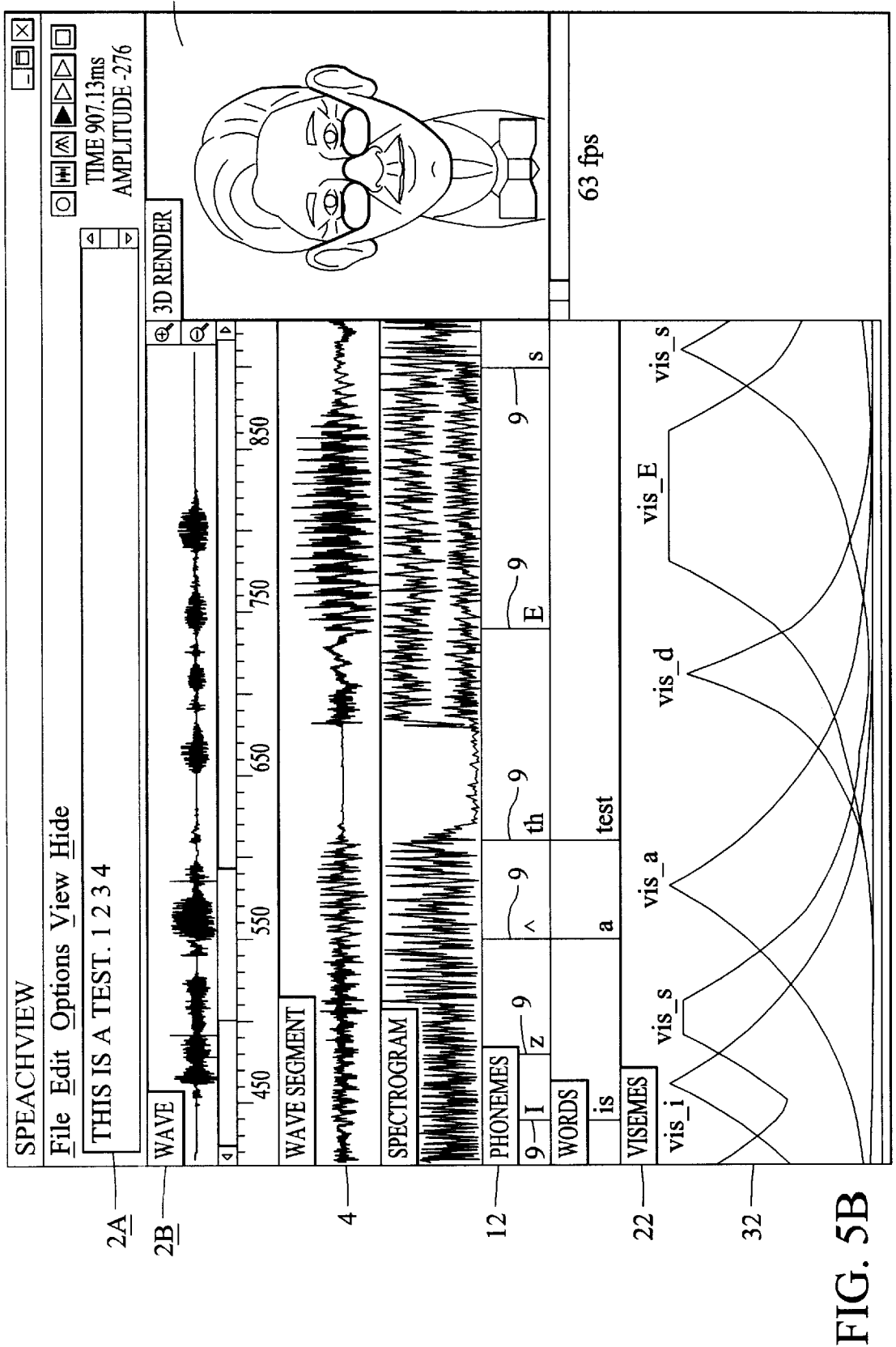
FIG. 5B is a computer screen printout illustrating the components of a voice synthesis application using the visual speech synthesis process of FIG. 5A.

FIG. 5B more clearly illustrates viseme tracks 32 used in the synthetic visual speech production of this invention. Referring to FIG. 5B, because neighboring visemes 22 influence each other, the shape of any given viseme track 32 will depend on the context in which it occurs, or in other words, on what was said. Also due to neighboring viseme influences, very rarely will any given viseme 22 have one hundred percent contribution to articulator placement at any given time. When more than one viseme 22 contributes to articulator placement, their tracks 32 overlap. Any number of visemes 22 can contribute to articulator placement at any given time, and hence, multiple tracks 32 can overlap. Also, in addition to being dependent on what was said, the shape of a viseme track 32 also depends on how fast something is said. Faster speech, for instance, makes each viseme 22 active over a shorter period of time and therefore generates steeper viseme curves 32. The coarticulation engine 30 of this invention is not tied to a specific 3D model because the tracks 32 generated by the engine 30 can be used to drive any 3D model as long as the model can associate the tracks 32 to specific viseme targets models 62 (see FIG. 2).

The construction of the viseme target models 62 will now be discussed in more detail with reference to FIGS. 2 and 4. First, with specific reference to FIG. 4, Static 3D models are generally wire-frame based. A wire frame model 60A is typically made up of many separate triangles (but could be made of squares or other types of polygons) arranged in three dimensional space. Each triangle consists of x, y, and z points and a directional indicator. For a more realistic 3D model, the triangles of the basic wire frame model 60A are filled with shading, as shown by model 60B. The shading gradient in each triangle is based on its directional indicator. Smoothing is then done to make the edges round and to blend between triangles, as shown by model 60C. The smoothed 3D model 60C can then have a texture map applied to it to associate a texture or material With each of the triangles. A texture map, for example, can contain an image of a person which is "wrapped around" the smoothed model 60C. Texture mapping adds still more realism to the 3D model. Finally, texture interpolation facilitates blending of textures between triangles to produce a final 3D model 60D.

Now with specific reference to FIG. 2, unlike the parametric systems, which require a complex parametric model for visual speech synthesis, a simple 3D model in a neutral position 60 with additional target models 62 representing visemes (e.g., 62A, 62B) and other desired character images (e.g., 62C) is all that is required to create the realistic facial animation of this invention. The exemplary target models shown in FIG. 2 include a /w/ viseme model 62A, an /i/ viseme model 62B, and a character emotion (smile+jawdown+headright) model 62C. The target models 62 can be created with only minor modifications to the neutral model 60 and are therefore relatively easy to produce. The target models 62 thus created can be used to produce a realistic synthetic visual speech output according to this invention by morphing between them based on the influence of active visemes, as determined by the coarticulation engine.

As can also be seen from the foregoing explanation, this general purpose approach to modeling can be readily extended beyond visemes to include facial expressions, gestures and general head/body movement. These additional targets, such as the smile model 62C, can be mixed/blended in with the, coarticulation to produce life-like behavior. An "auto expression" feature according to this invention automatically adds tracks for non-viseme targets in small psuedo-random amounts to provide non-stationary head and eye movement. This is done in such a way so as not to track in a linear fashion, which would result in robotic-like movements. Also, care is taken not to "undo" or interfere with the active visemes. Auto expressions are applied even while not speaking. Additionally, non-speech behavior can be scripted by adding mark-up tags to text input or by manipulating slider controls in a graphical user interface.

Typical non-viserme targets include:

browcurl, browdown, browin, browup, eyesdown, eyesleit, eyesright, eyesquint, eyesup, frown, grin, jawdown, lidsdown, moveback, moveforward, rotatedown, rotateleft, rotateright, rotateup, smile, wagright, wagright, blink, arnup, armdown, etc.

Morphing naturally between visemes requires combining target models 62 based on their viseme's influence on articulator position at given points in time during the transition. The process of combining target models 62 based on viseme weight is called weighted blending. Blended models 42 are rendered graphically for display using a 3D rendering engine 50 (see FIG. 1). The blending and 3D rendering processes will now be described in more detail with reference to FIGS. 1, 2, and 4.

A blended 3D model 42 represents the placement of articulators at a given point in time and is formed from either a single target model 62 or from a combination of multiple target models 62. Whether the blended 3D model 42 is a single target model 62 or a combination of target models 62 is determined by the number of visemes 22 that are active at that point in time.

When multiple visemes 22 are active at the same time, target models 62 for each of the active visemes 22 will be represented in the blended 3D model 42 based on their viseme's weight 32 at that specific point in time.

Blending of target models 62 according to one embodiment of this invention is done in a morphing engine 40 by base point mixing all of the target models 62 for the visemes 22 that are active at each specified point in time. Viseme activity is determined from the viseme tracks 32, which contain viseme weights over time. The viseme tracks 32 are provided to the morphing engine 40 from the coarticulation engine 30. The morphing engine 40 uses the weights of the overlapping visemes 22 at a given point in time to blend their target models 62 together. In this way, all of the target models 62 contributing to the articulator position at a given time are morphed (or blended) together based on their percentage contribution. The result of each blending operation is a combined 3D model (or blended model) 42. Accordingly, each blended model 42 represents the placement of articulators for its point in time based on coarticulation. The timing of these models is determined by the frame rate for the application (i.e., typically 30 or 60 frames per second).

Once the blended modeling data 42 is obtained, the final 3D models for each time position can be rendered in sequence toproduce an animated synthetic visual speech output which accounts for coarticulation considerations. The blended models 42 from the morphing engine 40 are sent to a 3D model rendering engine 50 to produce a dynamic 3D model (or animation) 52 of the synthetic visual speech. A dynamic 3D model 52 consists of multiple static 3D models rendered sequentially over time. Accordingly, to produce the synthetic visual speech 52 of this invention, a rendering engine 50 renders the blended 3D models 42 sequentially in real-time. In a preferred embodiment, the series of blended 3D models 42 that make up the animated 3D model 52 share the same basic geometry. In order to increase processing speed, therefore, only the geometric features which change position are taken into account in rendering the blended models 42. When combined based on their tracks 32, target viseme models 62 provide a close approximation of the natural dynamics of coarticulation. The animation 52 can then be lipsynced to an audio file 58 corresponding to the speech input 2B to produce a multimedia output 102 from a multimedia output formatter 100.

There are various alternatives for storing the software for generating the multimedia output 102 in a client/server environment. For instance, coarticulation, morphing, and animation generating software may all be stored on the client with only the stream audio coming from the server. Alternatively, the animation software may be on the client with the coarticulation and morphing software on the server. In that case, both the stream audio and the blended models to drive the animation would be streamed from the server. Yet another option would be to provide all of the software on the server with only a streamed multimedia output 102 being supplied to the client.

The implementation of this invention is unique in the use of speaker-independent modeling techniques and in the output of generic morphing targets (viseme weights) 32 as opposed to model-specific control parameters from a neural network. This approach therefore provides a general purpose solution to the problem of realistic facial animation. It applies equally well to any 3D model provided with articulators (whether human, animal, object, etc.).

There are several visual speech synthesis processes which particularly lend themselves to automatic blending of multiple weighted targets according to this invention. These processes include, for instance, producing a visual speech animation in synchronization with a voice output using both voice and text input, converting text-only input into synthetic audio and visual speech, real-time high-latency lipsyncing using a voice-only input, and real-time low-latency lipsyncing using a voice-only input.

The first of these processes for producing synthetic visual speech contemplates the use of both text and voice speech input. FIG. 5A is a block diagram illustrating a system and process 1A for producing a lipsyncing animation using a text input 2A and a corresponding voice input 2B. FIG. 5B is a computer screen printout of a voice synthesis application illustrating the components of the visual speech synthesis process 1A of FIG. 5A. Specifically, FIG. 5B shows a text input 2A containing speech information, a voice (waveform) input 2B corresponding to the text input, a wave segment 4 representing a portion of the speech input 2, phonemes 12, phoneme alignment bars 9 showing phoneme duration, viseme tracks 32, and a character image representing a 3D lipsyncing animation 52. The dual input visual speech synthesis system and process 1A will now be described with reference to FIGS. 5A and 5B.

According to this process 1A, a user inputs a voice file 2B and a text file 2A representing the same speech input into the system. The text file 2A must correspond exactly to the voice file 2B in order for the process to work properly. The system 1A then takes the voice and text inputs 2B, 2A and forces an alignment between them in a forced alignment generator 18. Because the text input 2A informs the system 1A of what the voice input 2B says, there is no need to attempt to separately recognize the phonetic components of the speech input from the voice file 2B, for example, by using a speech recognition program. Instead, the words from the text file 2A are segmented them into phonemes 12 by a phoneme neural network 16. The forced alignment generator 18 finds the boundaries of those phonemes 12 in the voice file 2B to identify segmentation information 14 of the speech inputs 2A, 2B. This segmentation information 14 includes phoneme boundary locations (corresponding to alignment bars 9) and phoneme duration (time between alignment bars 9). The system 1A also includes a viseme identifier 20 that takes the phonemes 12 and identifies their corresponding visemes 22. The viseme identifier 20 may be part of a coarticulation engine 30, part of the phoneme neural network 16, or independent of both.

The coarticulation engine 30 contains a neural network and is used to obtain blending (coarticulation) data 32, also referred to as viseme tracks. These viseme tracks 32 are weighting curves of the active visemes 22 over time. A morphing engine 40 blends viseme target models 62 (see FIG. 2) corresponding to the active visemes 22 together based on the coarticulation data 32 to produce blended modeling data (blended models) 42. A 3D rendering engine 50 renders 3D images corresponding to the blended models 42 sequentially in real-time to produce a lipsyncing animation 52. The animation 52 is finally combined with an audio output 58 (which is the same as the voice input 2B) in a multimedia output formatter 100 to produce a multimedia output 102. It should be noted that the dual input requirement of this system 1A prevents "live" execution.

Figure 6:
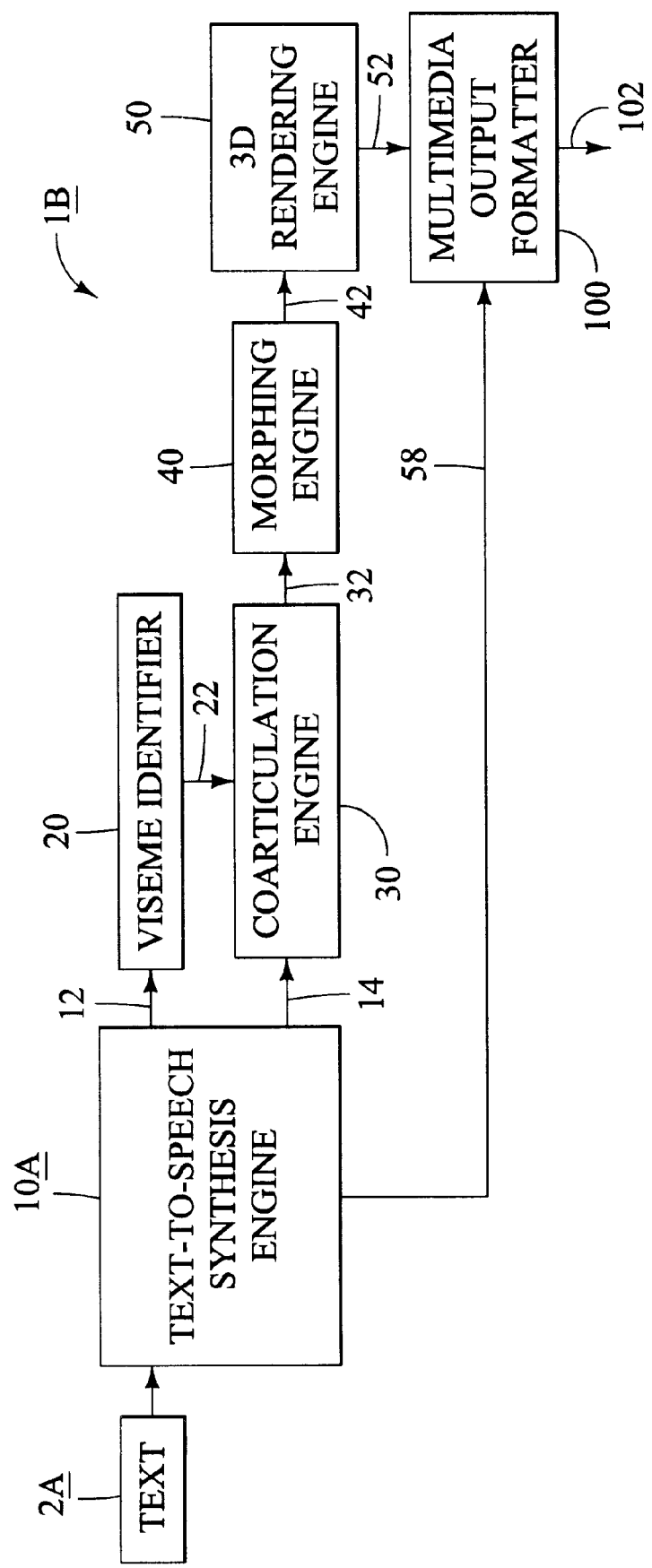
FIG. 6 is a block diagram illustrating the synthetic visual speech production process of FIG. 1 based on a text-only input according to another embodiment of the present invention.

A second visual speech synthesis system and process contemplated by this invention is based on a text-only input. FIG. 6 is a block diagram illustrating a text-to-synthetic audio and visual speech system and process 1B. Referring to FIG. 6, in this system 1B, a text input 2A is broken down into phonemes 12 and synthesized into a waveform 58 using a conventional text-to-speech (TTS) synthesis engine 10A. Because the speech waveform 58 is synthesized by the system 1B, the system 1B already knows the phoneme segmentation information 14, including phoneme boundaries and duration, without the need for a recognition or alignment process. The system 1B uses a viseme identifier 20 to identify visemes 22 associated with the phonemes 12 and then passes the viseme 22 and segmentation information 14 through the coarticulation routine 30 to generate viseme tracks 32. The viseme tracks 32 are transmitted to a morphing engine 40 which produces blended models 42. A rendering engine 50 uses the blended models 42 to produce the facial animation 52. The synthesized voice 58 and facial animation 52 are combined in an output formatter 100 to produce a multimedia output 102. It should be noted that this process 1B works best with sentence-level input due to synthesis requirements and desire for fluency.

Because the voice output 58 from this system 1B is a synthetic voice, the user can be given the option of controlling specifications for the voice output 58. For.instance, voice characteristics such as voice-type, language, dialect, gender, pitch, speech rate, and others, can be modified by the user. User selectable voice-types can include man, woman, boy, girl, elderly man, elderly woman, robot, alien, and the like. Some similar voice configurability options can be provided to systems such as those in FIGS. 5A (1A) and 7 (1C) that receive voice input rather than, or in addition to, text input, by providing them with a voice transformation filter.

Figure 7:
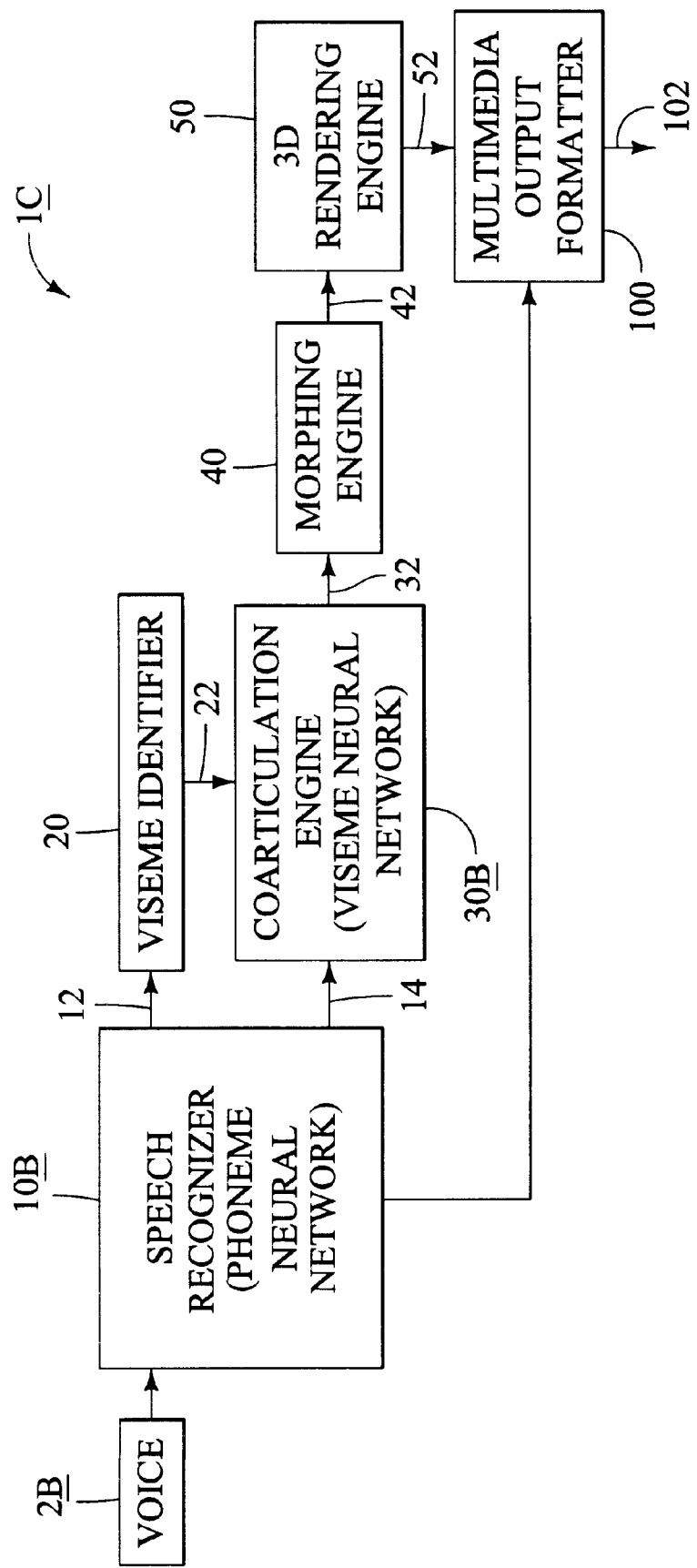
FIG. 7 is a block diagram illustrating the synthetic visual speech production process of FIG. 1 based on a voice-only input according to yet another embodiment of the present invention.

FIG. 7 is a block diagram of a system and process 1C for converting a voice-only input 2B into a synthetic visual speech output 52. An important consideration in this process is the delay between input and output. The delay between speech input into the system and the output from the system is referred to as system latency. High-latency applications have relatively long delays between input and output. Low-latency applications have minimal delays. Referring to FIG. 7, in both high- and low-latency real-time applications using this process 1C, the voice input 2B is transformed into synthetic visual speech. Specifically, in this process 1C, the voice input 2B, typically in the form of a wave file, goes directly into a specially modified speech recognizer 10B. The speech recognizer 10B uses a neural network trained on phoneme transition probabilities to constrain phoneme combinations. The speech recognizer 10B identifies phonemes 12 that are used to identify visemes 22, and produces phonetic segmentation information 14 that is passed on to the coarticulation routine 30. The coarticulation engine 30 contains its own neural network, which it uses to generate viseme tracks 32. These tracks 32 are then used to blend target models 62 (see FIG. 2) into blended models 42 in a morphing engine 40. The blended models 42 are rendered using a rendering engine 50 into an animation 52, which is synchronized with a voice output 58, to drive a multimedia output 102 through an output formatter 100.

Unlike the dual-mode input system 1A, in a voice-only input system 1C, the process 1C does not have the benefit of knowing beforehand what was said. A speech recognition routine must therefore be used to determine the speech input's most likely phonemes 12, as well as their segmentation information 14, including boundaries and duration. Although this method 1C is not as accurate as a method 1A using both voice and text input, it is fairly forgiving. Also unlike the dual input process 1A, but beneficially so, the voice-only transformation process 1C is suitable for both "live" and "off-line" use. In order to improve live performance, the input speech could be streamed to reduce latency requirements. Audio and visual recognition buffers should also be fine-tuned to minimize latencies.

Further considerations for "live" use of the voice input only visual speech synthesis process 1C will now be explained. A visual speech synthesizer's 1C processing speed is defined relative to real-time. If it takes the synthesizer 1C the same amount of time to process the speech as it took to produce the input 2B, then the synthesizer 1C is operating in "real-time." In other words, when one second of speech input 2B takes one second to process, then the synthesizer 1C is operating in real-time. Even though the synthesizer 1C processes in real-time, however, there may be delay (latency) between the time of the input 2B and the time of the output 52. One cause of latency is system buffers. Buffers store data until the buffer becomes full. Only after a buffer fills up does it output its stored data. Buffer windows must therefore be filled before the result can be output. To complicate things further, there are frequently multiple buffers used for processing speech. Each buffer used increases the latency of the system.

Other latency problems arise with respect to particular words. Some words, for example, present complex latency problems because of the dominance of later occurring visemes over previously occurring ones. The word "stew" is one such word. The /ew/ sound in "stew" has dominance over the /s/ and the /t/ despite the fact that it occurs later in time. When saying the word "stew," an anticipatory lip rounding typically occurs during the pronunciation of the /s/ and the /t/ in preparation for the later occurring /ew/. Because it is impossible to anticipate what visemes will occur later and, therefore, to predict what effect they will have on earlier occurring ones, the later phonemes must be sensed before an accurate visual representation of the word can be produced. This requirement creates an inherent latency problem due to reverse coarticulation where truly accurate visual representation is desired. For this reason, in applications requiring low-latency real-time speech, the quality of the visual speech representation must often be sacrificed to satisfy the low-latency requirement.

High-latency applications have a relatively long delay between input and output. For high-latency real-time voice-to-visual speech applications, it is possible to take into account the effects of later occurring visemes (reverse coarticulation). Specifically, special high-latency buffer manipulations can be used in order to take into account the fact that later visemes may significantly affect earlier ones. Low-latency applications, however, do not have the luxury of a long delay between input and output and it is therefore extremely difficult to take reverse coarticulation into account. Accordingly, some sacrifice in quality is inherent in the tradeoff between high and low latency.

Low-latency applications require complex ways of reducing the system delay without unduly sacrificing output quality. In particular, low-latency applications require a great deal of their own buffer manipulations to reduce system delay. A method of producing real-time "live" lipsyncing according to this invention is provided using "pipelined" lipsyncing of "live" audio. "Live" or "streaming" audio refers to digital audio that is made available (such as across a network or the internet) as a stream of smaller waves. "Pipelined" processing means that the waves are processed as they become available, usually before the entire audio transmission is complete. The advantages of streaming and pipeline processing are that buffer requirements are minimized, thereby limiting latency.

Figure 8:
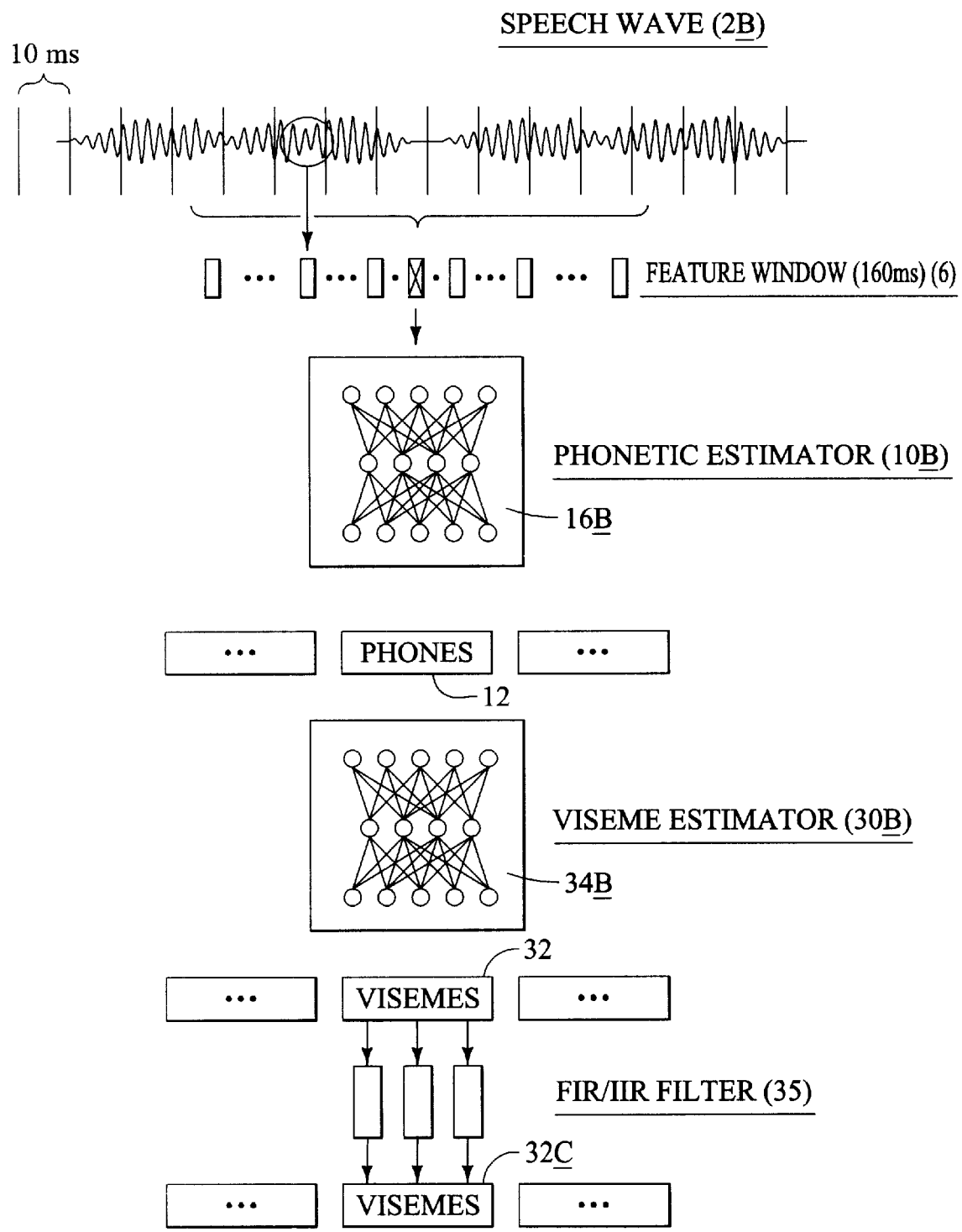
FIG. 8 is a block diagram illustrating the conversion of a speech wave input into a filtered viseme output according to a still further embodiment of the synthetic visual speech production process of FIG. 1 based on voice-only inputs.

FIG. 8 shows the architecture 1D for providing real-time "live" lipsyncing according to one embodiment of the present invention. The approach 1D of FIG. 8 uses a standard general-purpose speaker-independent front end, such as described previously. The input is a speech-only input stream 2B with no text input. A regularized viseme network eliminates the need for language modeling and expensive Viterbi-type search. It is preferably used with the 3D viseme-based morphing engine also described previously. This approach ID also uses neural networks for both phoneme and viseme identification 16B, 34B to speed up processing time and reduce footprint requirements. The in-line processing of this embodiment also eliminates the need for time-aligned acoustic phonetic data as described in U.S. Pat. No. 5,657,426 to Waters, et al.

Referring to FIG. 8, a speech input stream 2B, or speech wave, is received into the system in 10 ms frames at a sampling rate of typically between 8 kHz to 45 kHz (depending on the system capability and the desired speech quality). A feature representation is computed for each frame and assembled into a content (feature) window 6. The feature window 6 contains 160 ms of speech information or, in other words, data from sixteen 10 ms frames. The feature window 6 is transmitted to a phonetic (phoneme) estimator 10B. The phoneme estimator 10B includes a phoneme neural network 16B which receives the feature window 6 as an input and produces context-dependent phoneme (phone) estimates 12 as an output. The phoneme estimates 12 are then sent to a viseme estimator 30B.

The viseme estimator 30B includes a viseme neural network 34B which takes the phoneme estimates 12 and produces viseme data 32 for the frames. The viseme data 32 includes weighting information. Filtering can also be used to further improve the transition between visemes. A preferred filtering process is Finite Impulse Response/Infinite Impulse Response (FIR/IIR) filtering. The viseme data is run through a FIR/IIR filter to obtain filtered and smoothed viseme weights 32C. Voicing, duration, and energy modeling can also be added as net inputs. The filtered viseme weights 32C are then used in the morphing engine 40 (see FIG. 1) to produce blended models 42, which are in turn used to produce an animated 3D output 52 from the rendering engine 50. The latency according to the architecture shown in FIG. 8 is relatively low and is equivalent to the length of the post-context feature vector, currently around 80 ms.

Figure 9:
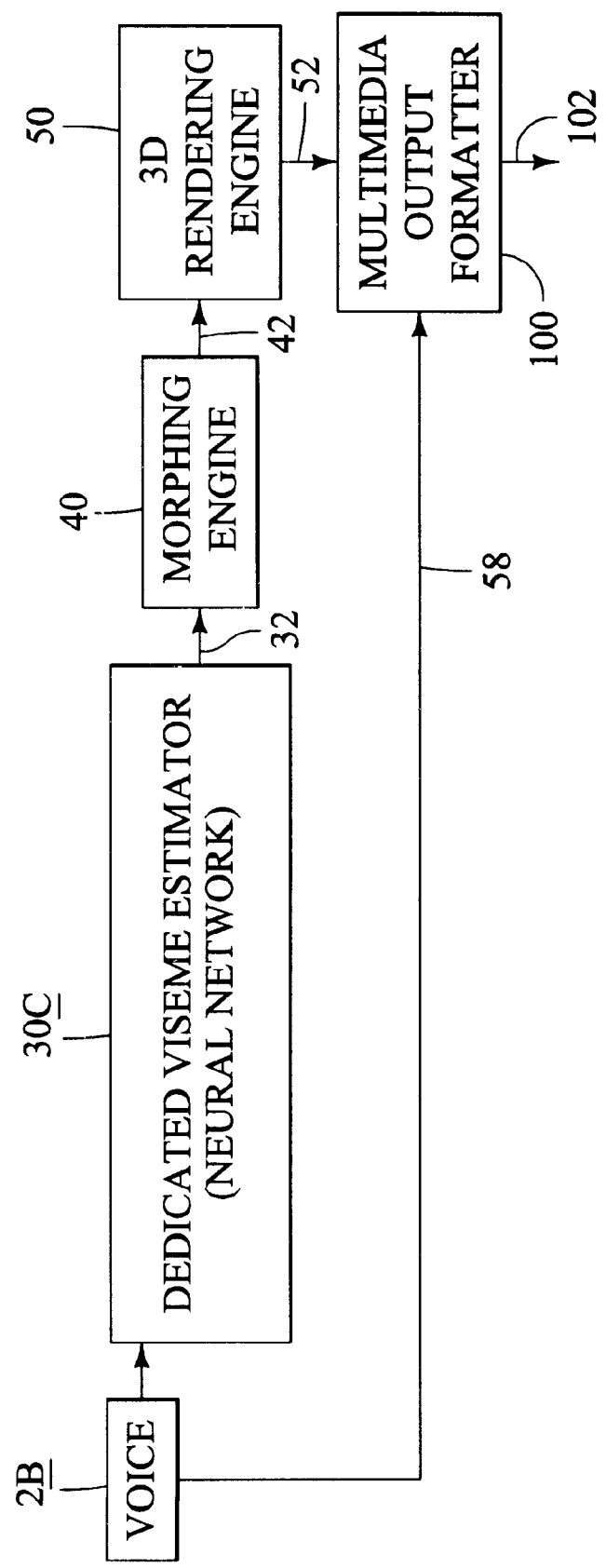
FIG. 9 is a block diagram illustrating the operation of a dedicated viseme estimator for use in a synthetic visual speech production process, similar to the process shown in FIG. 8, according to another embodiment of the invention.

According to another embodiment of this invention, shown in FIG. 9, another low-latency ("live") real-time synthetic visual speech synthesizer 1E involves the use of a dedicated viseme estimator 30A. The dedicated viseme estimator 30A collapses the entire process of going from audio speech input 2B to viseme tracks 32 into a single artificial neural network 34A. The neural network 34A is trained on viseme deformability and dominance data such as produced by the Viterbi search and coarticulation engine of the other embodiments. An input into the trained network 34A includes mel-frequency cepstral coefficients (MFCC) and MFCC delta features for a 160 ms window of the voice input 2B. An network output includes viseme weights 32 for the same window length. This approach holds advantages of simplicity and fewer buffers, thereby reducing the latency caused by generating morphing targets (blending data) 32.

Several specific types of applications using the previously discussed processes of this invention are further contemplated. These applications include audio or text input chat applications, multi-player games, speech training applications, email readers, and voice animated greeting card applications, to name only a few. The specifics of some of these applications will now be further described.

A chat application can be based on any of the systems described previously. For a chat application based on any of the systems 1A, 1B, 1C, 1D, 1E of FIGS. 5A, 6, 7, 8, or 9, a sender (user) would provide an input file 2A, 2B that is transformed into a visual speech animation 52 synchronized with the voice output 58 to produce a multimedia output 102. The multimedia output 102 becomes a network communication that may either be one-way (broadcast), two-way (interactive), or multi-way (conference). Broadcast communications may either be uni-cast (to a single user) or multi-cast (to multiple users) and may either be on-demand or continuous. Two-way or conference communications can be half-duplex or full-duplex.

A variety of user configurable options can be provided with chat applications. Users, for example, can be allowed to select a texture map for the 3D model (character creation), to choose between various pre-generated 3D models (character selection), and/or to select a background image (background selection), among other things. The chat application can also be configured to allow the selection of character auto-expressions. Auto-expressions are random facial and body movements (i.e., blinking, eyebrow movement, head tilting, etc.), that do not affect the speech articulators but make the character appear more lifelike. The user can further be allowed to control visual emotional expressions of the 3D character.

FIG. 10 is a flow chart showing an embodiment of a chat application 200. Referring to FIG. 10, a chat application 200 proceeds by receiving a user-supplied input containing speech information 210. A user also selects the desired recipients of the communication 220. The user can further select any desired character from an available character set, or may be given the option of supplying a texture map and/or background 230 to create a personalized character. The user can also choose whether or not to activate automatic expressions 240 and can select the emotion the character should display while talking 250. Voice output characteristics can also be chosen 260. Once the message has been entered and the user has configured the options as desired, the speech synthesis process takes place 270 and the animation and voice output are delivered to the recipient(s) 280. It should be readily apparent that these steps can be performed in any order and that many of these steps are optional and can be omitted without departing from the spirit and scope of the invention. Two specific chat applications, namely, an audio-based chat application and a text-based chat application, will now be described in more detail.

The audio-based chat application according to this invention preferably proceeds using one of the real-time lipsyncing approaches 1C, 1D, 1E described above. For example, an animated 3D front end is used in connection with an "live" audio-based transmission, such as a transmission over a local area network (LAN), the internet, or a combination thereof. The audio source can be digitized live or it can be streamed from a prerecorded audio source. A user can also be given the option of modifying the-voice output from the voice input using a voice transformation filter. Some specific environments in which audio-based chat applications can be used include person-to-person communications software, on-line multi-player gaming programs, multi-person conferencing software, and broadcast media including news, radio, music, sports announcing, etc.

In the text-based chat application, the text input from a sender is translated into a synthesized voice and a visual synthetic speech animation as described previously with respect to the text-to-visual speech conversion process 1B. An animated 3D front-end is used to provide visual speech from a text-based interaction. One particularly well-suited use for this application is as an audio/visual front-end for existing instant messaging services, such as AOL Instant messenger or Microsoft MSN Messenger, or for web-based chatrooms, such as AOL WebChat. The text input may be live (from keyboard) or batch (from file). A user of a text-based audio/visual chat application can also be allowed to select voice settings for the synthesized voice. For instance, the user can be allowed to select the type of voice, the speech-rate, arid/or the pitch of the voice. Voice-types could include man, woman, boy, girl, elderly man, elderly woman, robot, alien, or others. The text-based audio/visual chat mode could be used in person-to-person instant messaging, multi-person conferencing or chat rooms, on-line multi-player gaming, and broadcast media including news, radio, ticker displays, etc.

Yet another application according to the present invention is a customized lipsyncing greeting card application. According to this application, a user can create a customized talking or singing 3D lipsyncing greeting card on demand. To do this, a user creates a multimedia output featuring a lipsyncing character speaking a personalized message using any of the lipsyncing processes described above. The multimedia output is then delivered it to a recipient. The multimedia output may be contained in a movie file such as an AVI, Quicktime, or other format, or, alternatively, streaming media, such as Realmedia, or Advanced streaming format, could be used to deliver the multimedia greeting card. Yet another alternative is to supply the basic greeting card information to the recipient in a real-time rendering format, which could be used to generate the greeting card animation on the recipient's computer, containing a 3D animation engine. The animation engine comprises the morphing engine and the rendering engine for converting real-time rendering data (blending data) into a dynamic lipsyncing image.

FIG. 11 illustrates the operation of the application according to one embodiment 300. Referring to FIG. 11, a user supplies an input message containing speech information 310 to the application. The application could be internet based, so that the user uploads the input to an internet site. The user then selects a recipient or recipients of the greeting card 320. The user can also choose a 3D character 330, auto-expressions 340, emotion(s) 350, voice characteristics 360, etc. A synthetic visual speech system converts the text input into synchronized synthesized audio and visual speech and renders the greeting card in a multimedia output format (such as a movie format, or a streaming media format) 370. A notification, directing the recipient to the internet site or an ftp site where the greeting card can be retrieved, or containing the card as an attachment, is then sent to the recipient(s) at an email address(es) (or through an on-line notification) as specified by the user 380. The recipient can then pick up or open the greeting card file 390 and view and listen to the card 395. The animated greeting cards of this invention thereby provide customized multimedia content for the user.

It should be noted that any of the methods described above for providing animated 3D lipsyncing can be used in greeting card applications. Additionally, because AVI movies take up a lot of memory and produce latency problems, using either high bandwidth streaming or low bandwidth streaming are alternative delivery methods that reduce latency. Also realtime rendering format can be used to transmit the viseme data to the recipient whose computer would then generate the animation, locally.

Another character customization option that can be included with animated greeting card application (or with any of the other applications using text-only input according to this invention) is providing a synthesized singing voice from the text or speech input. According to this option, a user inputs an audio speech segment or text input containing the words to be sung. The application converts the audio or text speech input into a singing 3D character by converting the speech input to phonemes and visemes and then arranging the words in a pre-selected order based on a song template with customizable lyrics. The frequency and pitch of the voice output are then controlled (either automatically or based on user specified parameters) to produce a synthesized singing voice.

Another possible application for this invention is an email reader. FIG. 12 is a flow diagram illustrating an email reader application 400 according to this invention. The email reader 400 provides an audio and visual interface for delivering email in a manner similar to the text-chat mode, but in a non-real-time interaction. The user can select a 3D character and other desired options such as auto-expressions, emotions, voice characteristics, etc., for reading the email 410. The application could also allow these options to be configured differently based on specific senders or sender types. Male senders could be given a male image and voice, for instance. When a user selects the email (or automatically upon receipt, depending on a selected configuration), the email is received as an input to the application 420. The application converts the email text into a synthetic audio/visual output according to the text-to-audio and visual speech method described previously 430. A multimedia output (containing the synchronized synthetic audio and visual speech) is used to visually and audibly read the email message to the user 440 through a video display and speakers, respectively.

Having described and illustrated the principles of the invention in a preferred embodiment thereof, it should be apparent that the invention can be modified in arrangement and detail without departing from such principles. We claim all modifications and variations coming within the spirit and scope of the following claims.

We claim:

1. A method of producing synthetic visual speech, comprising:

receiving an input including speech information;

identifying visemes corresponding to the input;

calculating a weight of each of the visemes corresponding to the input using a coarticulation engine, wherein the coarticulation engine comprises viseme deformability information, and wherein each of the viseme weights corresponds to an amount of influence that the viseme has over other visemes active at a specified time; and producing a synthetic visual speech output based on the weights of the visemes corresponding to the input.

2. A method according to claim 1, wherein producing a synthetic visual speech output based on the weights of the visemes comprises:

retrieving a target model for each of the visemes identified; and morphing between the target models for the visemes using the weights of the visemes.

3. A method according to claim 2, wherein morphing between target models comprises base point mixing multiple target models using a morphing engine.

4. A method according to claim 1, wherein the coarticulation engine determines the weight of each viseme based on a variety of factors including viseme deformability, phoneme duration, and speech context.

5. A method according to claim 1, wherein the viseme deformability information comprises a strength and a deformability percentage value.

6. A method according to claim 1, wherein the input comprises a text input, and wherein identifying visemes corresponding to the input comprises:

identifying phonemes corresponding to the text input using a phoneme neural network; and identifying visemes that correspond to the phonemes.

7. A method according to claim 6, wherein the input further comprises a voice input, and wherein using a coarticulation engine to calculate a weight of each of the visemes comprises:

forcing an alignment between the text input and the voice input to determine phoneme duration; and inputting phoneme duration and context information into a coarticulation algorithm to determine viseme weights.

8. A method according to claim 1, wherein receiving an input comprises receiving a voice-only input, and wherein identifying visemes corresponding to the input comprises:

running the voice-only input through a speech recognition routine to determine probable phonemes of the input; and identifying the visemes that correspond to the probable phonemes.

9. A method according to claim 8, wherein the coarticulation engine comprises a neural network.

10. A method according to claim 8, wherein the synthetic visual speech output is produced substantially simultaneously with the input.

11. A method of generating synthetic visual speech, comprising:

receiving a voice input including speech information;

classifying the voice input into phonemes using a phoneme neural network;

identifying a viseme corresponding to each of the phonemes from the phoneme neural network;

calculating a viseme track for each of the visemes using a viseme neural network, wherein the viseme track comprises a sequence of viseme weights over time, and wherein each viseme weight represents an amount of influence of the viseme over other visemes active at a given time;

morphing between target models of the visemes according to their tracks by producing a series of blended models; and rendering the series of blended models sequentially to produce a visual speech animation.

12. A method of claim 11, wherein morphing between target models of the visemes according to their tracks comprises blending viseme target models together based on the weights of each viseme at given points in time determined by an output frame rate of the system.

13. A method according to claim 11, wherein the steps of receiving an input, separating the input into phonemes, and calculating viseme tracks are performed on a server; and wherein the steps of morphing between target models and rendering the series of blended models is performed on a client.

14. A computer readable medium storing computer code comprising:

instructions for receiving an input including speech information;

instructions for identifying visemes corresponding to the input;

instructions for calculating a weight of each of the visemes corresponding to the input using deformability information, wherein each of the viseme weights corresponds to an amount of influence that the viseme has over other visemes active at a given time; and instructions for producing a synthetic visual speech output based on the weights of the visemes corresponding to the input.

15. A computer readable medium according to claim 14, wherein the instructions for receiving an input, identifying visemes, and calculating viseme weights are configured for use on a server; and wherein the instructions for producing a synthetic visual speech output are configured for use on a client.

16. A computer readable medium according to claim 14, wherein the instructions for receiving an input are configured for use on a server; and wherein the instructions for identifying visemes, calculating weights, and producing a synthetic visual speech output are configured for use on a client.

17. A computer readable medium according to claim 14, wherein the computer readable medium is configured for use on a server and further comprises instructions for transmitting a multimedia output to a client, the multimedia output comprising the synthetic visual speech output that is substantially synchronized with a voice output corresponding to the input.

18. A system for producing synthetic visual speech, comprising:

a receiver to receive an input representing a speech segment;

a first neural network to classify the speech segment according to its phonetic components;

a coarticulation engine comprising deformability information to determine viseme tracks corresponding to the phonetic components of the speech input, wherein the viseme tracks each comprise a sequence of viseme weights over time, and wherein each viseme weight represents an amount of influence of the viseme over other visemes active at a given time; and a morphing engine for morphing between viseme models based on the viseme tracks to enable a realistic synthetic visual speech output corresponding to the speech segment.

19. A system according to claim 18, wherein the input representing a speech segment comprises a text input and a voice input, and the system further comprises a forced alignment generator configured to force an alignment between the text input and the voice input to determine a duration of each of the phonetic components.

20. A system according to claim 19, wherein the durations of the phonetic components are used in the coarticulation engine to determine the viseme tracks.

21. A coarticulation engine for calculating viseme tracks comprising:

a coarticulation algorithm configured to receive data inputs corresponding to a plurality of visemes;

said data inputs representing a context, and a duration of each of the visemes; and said coarticulation engine further configured to produce data outputs comprising a weight for each of the visemes using deformability information, wherein each viseme weight represents an amount of influence of the viseme over other visemes active at a given time.

22. A coarticulation engine according to claim 21, wherein the coarticulation engine comprises a neural network classifier trained on viseme deformability data; wherein the data inputs to the neural network classifier comprise mel-frequency cepstral coefficients (MFCC) and MFCC delta features for a window of the voice input; and wherein the data outputs from the neural network classifier are viseme weights for the window.

23. A method for generating a user-customizable three-dimensional lipsyncing greeting card, comprising:

receiving a user-defined input containing speech information;

converting the input into a customized electronic greeting card comprising a three-dimensional visual speech animation comprising a lipsyncing character synchronized with an audio output corresponding to the input; and delivering the customized electronic greeting card to a recipient identified by the user.

24. A method according to claim 23, further comprising customizing the three-dimensional visual speech animation based on user-selected configurability options, wherein the user-selected configurability options include one or more configurability options selected from a group comprising:

selecting one of a plurality of three-dimensional characters to be the lipsyncing character;

texture mapping an image onto a three-dimensional character model to produce a personalized character to be the lipsyncing character;

supplying a background image for the animation;

enabling one or more auto-expressions for the lipsyncing character to provide realistic non-speech movements;

selecting one or more emotions for the lipsyncing character to convey emotional content through visual expressions;

selecting a singing voice for the audio output; and selecting voice characteristics for the audio output.

25. A method according to claim 23, wherein delivering the customized electronic greeting card to a recipient identified by the user comprises:

sending an electronic mail or on-line delivery notification to the recipient; and making the customized electronic greeting card available for download by the recipient at an internet site.

26. A method according to claim 25, wherein the customized electronic greeting card is made available to the recipient in either a movie format, a streaming media format, or a real-time rendering format.

27. A method of providing an electronic greeting card featuring a three-dimensional lipsyncing character, comprising:

providing an Internet site;

allowing a user to supply an input containing speech information to the internet site;

converting the user-supplied input into an electronic greeting card comprising a three-dimensional lipsyncing character animated in synchronism with an audio output corresponding to the input; and delivering the electronic greeting card to a recipient specified by the user.

28. A method according to claim 27, wherein delivering the electronic greeting card to a recipient comprises:

sending an online or email notification to the recipient; and allowing the recipient to download the electronic greeting card from the internet site.

29. A method according to claim 27, wherein delivering the electronic greeting card to a recipient comprises:

sending an email containing the electronic greeting card as an attachment to the recipient at an address specified by the user.

30. A method for producing a computer animated lipsyncing, comprising:

providing a voice input into a first neural network to produce a phoneme output;

providing the phoneme output from the first neural network to a second neural network to produce a viseme track output, wherein the viseme track output comprises a sequence of viseme weights over time, and wherein each viseme weight represents an amount of influence of the viseme over other visemes active at a given time; and using the viseme track output to generate an animated three-dimensional lipsyncing image in real-time in substantial synchronism with an audio speech output corresponding to the voice input.

31. A method according to claim 30 wherein using the viseme track output to generate an animated three-dimensional lipsyncing image comprises transmitting a data file containing the viseme output to an animation generator comprising a morphing engine and a rendering engine in real-time rendering format.

32. A method according to claim 31, wherein the animation generator is located on a client computer and the voice input and viseme output are supplied from a server to the client.

33. A method according to claim 31, wherein the animation generator is located on a server and wherein a file containing the animated three-dimensional lipsyncing image and the audio speech output is transmitted from the server to a client computer in a streaming media format.

34. A method according to claim 30, further comprising:

filtering the viseme track output to produce a filtered and smoothed viseme track output.

35. A method according to claim 30, wherein the three-dimensional lipsyncing image and audio speech output are produced substantially simultaneously with the voice input.

36. An apparatus for producing a lipsyncing animation, comprising:

a frame processor to identify frames of a voice input;

a first neural network to receive the frames of the voice input and to identify a probable phoneme corresponding to each of the frames;

a second neural network to receive the probable phonemes and identify viseme weights for one or more visemes active during each of the frames, wherein a viseme weight represents an amount of influence of a corresponding viseme over other visemes active during that frame; and a rendering engine to render a three-dimensional lipsyncing animation based on the viseme weights in substantial synchronization with an audio output corresponding to the voice input.

37. An apparatus according to claim 36, further comprising a filter to filter the viseme weights to produce a filtered and smoothed viseme track for each of the active visemes.

38. An apparatus according to claim 36, wherein the second neural network is trained based on viseme data including viseme deformabilities.

39. An apparatus according to claim 36, further comprising a server comprising the first and second neural networks.

40. An apparatus according to claim 36, further comprising a client computer comprising the rendering engine.

41. A method for producing a synthesized visual communication over a network comprising:

receiving an input containing speech information into a first networked device;

converting the input into phonetic speech components using a phoneme neural network;

converting the phonetic speech components into weighted visual speech information, wherein the weighted visual speech information comprises information representing an amount of influence of a visual speech component over other visual speech components active at a given time;

producing a lipsyncing animation based on the weighted visual speech information; and displaying the lipsyncing animation in substantial synchronism with an audibilization of a voice output corresponding to the input through a second networked device.

42. A method according to claim 41, wherein producing the lipsyncing animation occurs on the first networked device, and wherein the lipsyncing animation and input are transmitted to the second networked device in a streaming media format.

43. A method according to claim 41, wherein producing the lipsyncing animation occurs on the second networked device, and wherein the weighted visual speech information and the input are transmitted to the second networked device in a realtime rendering format.

44. A method according to claim 41, wherein the input is a voice input and wherein displaying the lipsyncing animation and audibilizing the voice output occur substantially simultaneously with providing the voice input.

45. A method according to claim 41, further comprising:
receiving a second input containing speech information into the second networked device to be converted into synthetic visual speech to be displayed using the first networked device.

46. A method for providing a real-time synthetic communication comprising:
providing inputs containing speech information into a first one or more of a plurality of devices;
converting the inputs into viseme tracks, wherein the viseme tracks each comprise a sequence of viseme weights over time, and wherein each viseme weight represents an amount of influence of the viseme over other visemes active at a given time;
producing a communication comprising a synthesized visual speech animation for each of the inputs based on the viseme tracks, said communication further comprising an audio output corresponding to the input; and
outputting the communication through a second one or more of the devices.

47. A method according to claim 46, wherein the communication is a broadcast communication.

48. A method according to claim 46, wherein converting the inputs into viseme tracks and producing a communication comprising a synthesized visual speech animation and an audio output takes place on the first one or more of the devices.

49. A method according to claim 48, wherein the communication is transmitted from the first one or more of the devices to the second one or more of the devices in streaming media format.

50. A method according to claim 46, wherein converting the inputs into viseme tracks takes place on the first one or more of the devices, wherein the viseme tracks are transmitted from the first one or more of the devices to the second one or more of the devices, and wherein producing the communications takes place on the second one or more of the devices.

51. An email reader comprising:
a phoneme neural classifier for converting an email text or an audio attachment into its constituent plurality of phonemes;
a coarticulation engine to determine a weight of each of a plurality of visemes associated with each of the phonemes, wherein each viseme weight represents an amount of influence of the corresponding viseme over other visemes active at a given time;
a morphing engine for morphing between target viseme models based on viseme weights;
a text-to-audio speech synthesizer for synthesizing an audio voice output based on the phonemes from the email text; and
a rendering engine for rendering an email lipsyncing animation based on data from the morphing engine.

52. An email reader according to claim 51, further comprising:
an output formatter for combining the animation and the synthesized audio voice output into a multimedia output.

53. An email reader according to claim 51, further comprising:
user-customization options to allow a user to select a lipsyncing character for the animation and a voice-type for the voice output.

54. An email reader according to claim 53, wherein the user-customization options are configured to allow independent selection of the character and voice type for each of a plurality of email senders.

* * * * *